(12) United States Patent
Credelle

(10) Patent No.: US 7,417,648 B2
(45) Date of Patent: *Aug. 26, 2008

(54) COLOR FLAT PANEL DISPLAY SUB-PIXEL ARRANGEMENTS AND LAYOUTS FOR SUB-PIXEL RENDERING WITH SPLIT BLUE SUB-PIXELS

(75) Inventor: Thomas Lloyd Credelle, Morgan Hill, CA (US)

(73) Assignee: Samsung Electronics Co. Ltd., (KR)

( * ) Notice: Subject to any disclaimer, the term of this patent is extended or adjusted under 35 U.S.C. 154(b) by 218 days.

This patent is subject to a terminal disclaimer.

(21) Appl. No.: 10/278,352

(22) Filed: Oct. 22, 2002

(65) Prior Publication Data

US 2003/0128179 A1   Jul. 10, 2003

Related U.S. Application Data

(60) Provisional application No. 60/346,738, filed on Jan. 7, 2002.

(51) Int. Cl.
*G09G 5/02*   (2006.01)

(52) U.S. Cl. .................. 345/694; 345/690; 349/109

(58) Field of Classification Search .............. 345/72, 345/83, 88, 92, 204–205, 209, 96, 690, 172, 345/694; 349/106–109

See application file for complete search history.

(56) References Cited

U.S. PATENT DOCUMENTS

| | | | |
|---|---|---|---|
| 3,971,065 A | 7/1976 | Bayer | |
| 4,353,062 A | 10/1982 | Lorteije et al. | |
| 4,593,978 A | 6/1986 | Mourey et al. | |
| 4,632,514 A | 12/1986 | Ogawa et al. | |
| 4,642,619 A | 2/1987 | Togashi | |
| 4,651,148 A | 3/1987 | Takeda et al. | |
| 4,725,828 A * | 2/1988 | Cowlishaw | ............ 345/694 |
| 4,751,535 A | 6/1988 | Myers | |
| 4,773,737 A | 9/1988 | Yokono et al. | |
| 4,786,964 A | 11/1988 | Plummer et al. | |
| 4,792,728 A | 12/1988 | Chang et al. | |
| 4,800,375 A | 1/1989 | Silverstein et al. | |
| 4,822,142 A | 4/1989 | Yasui | |
| 4,853,592 A | 8/1989 | Strathman | |

(Continued)

FOREIGN PATENT DOCUMENTS

DE   197 46 329 A1   3/1999

(Continued)

OTHER PUBLICATIONS

"ClearType magnified," *Wired Magazine*, Nov. 8, 1999, Microsoft Typography, article posted Nov. 8, 1999, and last updated Jan. 27, 1999, © 1999 Microsoft Corporation, 1 page.

(Continued)

*Primary Examiner*—Kent Chang

(57) ABSTRACT

Various embodiments of a sub-pixel octal grouping are disclosed. The octal grouping may comprise three-color (red, green and blue) sub-pixels with blue colored subpixel comprising twice the number of positions within the octal sub-pixel grouping as the red and green colored sub-pixels. Various embodiments for performing sub-pixel rendering on the sub-pixel groupings are disclosed.

21 Claims, 21 Drawing Sheets

U.S. PATENT DOCUMENTS

| | | |
|---|---|---|
| 4,874,986 A | 10/1989 | Menn et al. |
| 4,886,343 A | 12/1989 | Johnson |
| 4,908,609 A | 3/1990 | Stroomer |
| 4,920,409 A | 4/1990 | Yamagishi |
| 4,965,565 A | 10/1990 | Noguchi |
| 4,966,441 A | 10/1990 | Conner |
| 4,967,264 A | 10/1990 | Parulski et al. |
| 5,006,840 A | 4/1991 | Hamada et al. |
| 5,052,785 A | 10/1991 | Takimoto et al. |
| 5,083,853 A | 1/1992 | Ueki et al. |
| 5,113,274 A | 5/1992 | Takahashi et al. |
| 5,132,674 A | 7/1992 | Bottorf |
| 5,142,392 A | 8/1992 | Ueki et al. |
| 5,144,288 A | 9/1992 | Hamada et al. |
| 5,196,924 A | 3/1993 | Lumelsky et al. |
| 5,233,385 A | 8/1993 | Sampsell |
| 5,311,205 A | 5/1994 | Hamada et al. |
| 5,311,337 A | 5/1994 | McCartney, Jr. |
| 5,315,418 A | 5/1994 | Sprague et al. |
| 5,334,996 A | 8/1994 | Tanigaki et al. |
| 5,341,153 A | 8/1994 | Benzschawel et al. |
| 5,398,066 A | 3/1995 | Martinez-Uriegas et al. |
| 5,436,747 A | 7/1995 | Suzuki |
| 5,450,216 A | 9/1995 | Kasson |
| 5,461,503 A | 10/1995 | Deffontaines et al. |
| 5,477,240 A | 12/1995 | Huebner et al. |
| 5,485,293 A * | 1/1996 | Robinder ............... 345/88 |
| 5,535,028 A | 7/1996 | Bae et al. |
| 5,541,653 A | 7/1996 | Peters et al. |
| 5,561,460 A | 10/1996 | Katoh et al. |
| 5,563,621 A | 10/1996 | Silsby |
| 5,579,027 A | 11/1996 | Sakurai et al. |
| 5,648,793 A | 7/1997 | Chen |
| 5,754,226 A | 5/1998 | Yamada et al. |
| 5,757,452 A | 5/1998 | Masaki et al. |
| 5,773,927 A | 6/1998 | Zimlich |
| 5,792,579 A | 8/1998 | Phillips |
| 5,815,101 A | 9/1998 | Fonte |
| 5,821,913 A | 10/1998 | Mamiya |
| 5,856,050 A | 1/1999 | Inoue et al. |
| 5,877,512 A | 3/1999 | Kim |
| 5,899,550 A | 5/1999 | Masaki |
| 5,917,556 A | 6/1999 | Katayama |
| 5,949,496 A | 9/1999 | Kim |
| 5,973,664 A | 10/1999 | Badger |
| 5,991,438 A | 11/1999 | Shaked et al. |
| 6,002,446 A | 12/1999 | Eglit |
| 6,005,582 A | 12/1999 | Gabriel et al. |
| 6,008,868 A | 12/1999 | Silverbrook |
| 6,023,315 A | 2/2000 | Harrold et al. |
| 6,034,666 A | 3/2000 | Kanai et al. |
| 6,038,031 A | 3/2000 | Murphy |
| 6,049,626 A | 4/2000 | Kim |
| 6,061,533 A | 5/2000 | Kajiwara |
| 6,064,363 A | 5/2000 | Kwon |
| 6,069,670 A | 5/2000 | Borer |
| 6,072,272 A | 6/2000 | Rumbaugh |
| 6,072,445 A | 6/2000 | Spitzer et al. |
| 6,075,905 A | 6/2000 | Herman et al. |
| 6,097,367 A | 8/2000 | Kuriwaki et al. |
| 6,108,122 A | 8/2000 | Ulrich et al. |
| 6,115,092 A | 9/2000 | Greene et al. |
| 6,137,560 A | 10/2000 | Utsumi et al. |
| 6,144,352 A | 11/2000 | Matsuda et al. |
| 6,160,535 A | 12/2000 | Park |
| 6,184,903 B1 | 2/2001 | Omori |
| 6,188,385 B1 | 2/2001 | Hill et al. |
| 6,198,507 B1 | 3/2001 | Ishigami |
| 6,219,025 B1 | 4/2001 | Hill et al. |
| 6,225,967 B1 | 5/2001 | Hebiguchi |
| 6,225,973 B1 | 5/2001 | Hill et al. |
| 6,236,390 B1 | 5/2001 | Hitchcock |
| 6,239,783 B1 | 5/2001 | Hill et al. |
| 6,243,055 B1 | 6/2001 | Fergason |
| 6,243,070 B1 | 6/2001 | Hill et al. |
| 6,271,891 B1 | 8/2001 | Ogawa et al. |
| 6,299,329 B1 | 10/2001 | Mui et al. |
| 6,326,981 B1 | 12/2001 | Mori et al. |
| 6,327,008 B1 | 12/2001 | Fujiyoshi |
| 6,340,994 B1 | 1/2002 | Margulis et al. |
| 6,348,929 B1 | 2/2002 | Acharya et al. |
| 6,356,278 B1 | 3/2002 | Stamm et al. |
| 6,360,023 B1 | 3/2002 | Betrisey et al. |
| 6,377,262 B1 | 4/2002 | Hitchcock et al. |
| 6,385,466 B1 | 5/2002 | Hirai et al. |
| 6,392,717 B1 | 5/2002 | Kunzman |
| 6,393,145 B2 | 5/2002 | Betrisey et al. |
| 6,396,505 B1 * | 5/2002 | Lui et al. ............... 345/613 |
| 6,429,867 B1 | 8/2002 | Deering |
| 6,441,867 B1 | 8/2002 | Daly |
| 6,453,067 B1 | 9/2002 | Morgan et al. |
| 6,459,419 B1 | 10/2002 | Matsubayashi |
| 6,466,618 B1 | 10/2002 | Messing et al. |
| 6,469,756 B1 | 10/2002 | Booth, Jr. |
| 6,469,766 B2 | 10/2002 | Waterman et al. |
| 6,486,923 B1 | 11/2002 | Maeshima et al. |
| 6,545,653 B1 | 4/2003 | Takahara et al. |
| 6,545,740 B2 | 4/2003 | Werner |
| 6,583,787 B1 | 6/2003 | Pfister et al. |
| 6,593,981 B1 | 7/2003 | Haim et al. |
| 6,600,495 B1 | 7/2003 | Boland et al. |
| 6,614,414 B2 | 9/2003 | De Haan et al. |
| 6,661,429 B1 | 12/2003 | Phan |
| 6,674,430 B1 | 1/2004 | Kaufman et al. |
| 6,674,436 B1 | 1/2004 | Dresevic et al. |
| 6,680,761 B1 | 1/2004 | Greene et al. |
| 6,681,053 B1 | 1/2004 | Zhu |
| 6,714,206 B1 | 3/2004 | Martin et al. |
| 6,738,526 B1 | 5/2004 | Betrisey et al. |
| 6,750,875 B1 | 6/2004 | Keely, Jr. et al. |
| 6,781,626 B1 | 8/2004 | Wang |
| 6,801,220 B2 | 10/2004 | Greier et al. |
| 6,804,407 B2 | 10/2004 | Weldy |
| 6,833,890 B2 | 12/2004 | Hong et al. |
| 6,836,300 B2 | 12/2004 | Choo et al. |
| 6,842,207 B2 | 1/2005 | Nishida et al. |
| 6,850,294 B2 | 2/2005 | Roh et al. |
| 6,856,704 B1 | 2/2005 | Gallagher et al. |
| 6,867,549 B2 | 3/2005 | Cok et al. |
| 6,885,380 B1 | 4/2005 | Primerano et al. |
| 6,888,604 B2 | 5/2005 | Rho et al. |
| 6,897,876 B2 | 5/2005 | Murdoch et al. |
| 6,903,754 B2 | 6/2005 | Brown Elliott |
| 6,914,649 B2 | 7/2005 | Liu |
| 6,927,754 B2 | 8/2005 | Lai |
| 6,928,196 B1 | 8/2005 | Bradley et al. |
| 6,930,676 B2 | 8/2005 | De Haan et al. |
| 6,937,217 B2 | 8/2005 | Klompenhouwer et al. |
| 6,950,156 B1 | 9/2005 | Yoshida |
| 6,989,876 B2 | 1/2006 | Song et al. |
| 7,110,012 B2 | 9/2006 | Messing et al. |
| 7,123,277 B2 | 10/2006 | Brown Elliott et al. |
| 7,129,955 B2 | 10/2006 | Motomura |
| 7,167,186 B2 | 1/2007 | Credelle et al. |
| 7,184,066 B2 | 2/2007 | Elliot et al. |
| 7,221,381 B2 | 5/2007 | Brown Elliott et al. |
| 2001/0017515 A1 | 8/2001 | Kusunoki et al. |
| 2001/0040645 A1 | 11/2001 | Yamazaki |
| 2001/0048764 A1 | 12/2001 | Betrisey et al. |
| 2002/0012071 A1 | 1/2002 | Sun |
| 2002/0015110 A1 | 2/2002 | Brown Elliott |
| 2002/0017645 A1 | 2/2002 | Yamazaki et al. |
| 2002/0030780 A1 | 3/2002 | Nishida et al. |
| 2002/0054263 A1 | 5/2002 | Kim et al. |

| | | | |
|---|---|---|---|
| 2002/0093476 A1 | 7/2002 | Hill et al. |
| 2002/0118019 A1 | 8/2002 | Nomura |
| 2002/0122160 A1 | 9/2002 | Kunzman |
| 2002/0140831 A1 | 10/2002 | Hayashi |
| 2002/0149598 A1 | 10/2002 | Greier et al. |
| 2002/0186229 A1 | 12/2002 | Brown Elliott |
| 2002/0190648 A1 | 12/2002 | Bechtel et al. |
| 2003/0011613 A1 | 1/2003 | Booth, Jr. |
| 2003/0016310 A1 | 1/2003 | Lee et al. |
| 2003/0034992 A1 | 2/2003 | Brown Elliott et al. |
| 2003/0043567 A1 | 3/2003 | Hoelen et al. |
| 2003/0071775 A1 | 4/2003 | Ohashi et al. |
| 2003/0071826 A1 | 4/2003 | Goertzen |
| 2003/0071943 A1 | 4/2003 | Choo et al. |
| 2003/0072374 A1 | 4/2003 | Sohm |
| 2003/0077000 A1 | 4/2003 | Blinn et al. |
| 2003/0085906 A1 | 5/2003 | Elliott et al. |
| 2003/0090581 A1 | 5/2003 | Credelle et al. |
| 2003/0103058 A1 | 6/2003 | Brown Elliott et al. |
| 2003/0117423 A1 | 6/2003 | Brown Elliott |
| 2003/0128225 A1 | 7/2003 | Credelle et al. |
| 2003/0184571 A1 | 10/2003 | Hirayama |
| 2003/0218614 A1 | 11/2003 | Lavelle et al. |
| 2003/0218618 A1 | 11/2003 | Phan |
| 2004/0021804 A1 | 2/2004 | Hong et al. |
| 2004/0051724 A1 | 3/2004 | Elliott et al. |
| 2004/0061710 A1 | 4/2004 | Messing et al. |
| 2004/0075764 A1 | 4/2004 | Law et al. |
| 2004/0080479 A1 | 4/2004 | Credelle |
| 2004/0085495 A1 | 5/2004 | Roh et al. |
| 2004/0095521 A1 | 5/2004 | Song et al. |
| 2004/0108818 A1 | 6/2004 | Cok et al. |
| 2004/0114046 A1 | 6/2004 | Lee et al. |
| 2004/0150651 A1 | 8/2004 | Phan |
| 2004/0169807 A1 | 9/2004 | Rho et al. |
| 2004/0174380 A1 | 9/2004 | Credelle et al. |
| 2004/0174389 A1 | 9/2004 | Ben-David et al. |
| 2004/0179160 A1 | 9/2004 | Rhee et al. |
| 2004/0189643 A1 | 9/2004 | Frisken et al. |
| 2004/0196297 A1 | 10/2004 | Elliott et al. |
| 2004/0213449 A1 | 10/2004 | Safee-Rad et al. |
| 2004/0239813 A1 | 12/2004 | Klompenhouwer |
| 2004/0239837 A1 | 12/2004 | Hong et al. |
| 2004/0247070 A1 | 12/2004 | Ali et al. |
| 2004/0263528 A1 | 12/2004 | Murdoch et al. |
| 2005/0001856 A1 | 1/2005 | Sparre et al. |
| 2005/0007327 A1 | 1/2005 | Elion et al. |
| 2005/0024380 A1 | 2/2005 | Lin et al. |
| 2005/0068477 A1 | 3/2005 | Shin et al. |
| 2005/0083277 A1 | 4/2005 | Credelle |
| 2005/0083356 A1 | 4/2005 | Roh et al. |
| 2005/0094871 A1 | 5/2005 | Berns et al. |
| 2005/0099426 A1 | 5/2005 | Primerano et al. |
| 2005/0140634 A1 | 6/2005 | Takatori |
| 2005/0151752 A1 | 7/2005 | Phan |
| 2005/0162600 A1 | 7/2005 | Rho et al. |
| 2005/0169551 A1 | 8/2005 | Messing et al. |

FOREIGN PATENT DOCUMENTS

| | | |
|---|---|---|
| DE | 199 23 527 | 11/2000 |
| DE | 199 23 527 A1 | 11/2000 |
| DE | 201 09 354 U1 | 9/2001 |
| EP | 0 158 366 A2 | 10/1985 |
| EP | 0 203 005 A1 | 11/1986 |
| EP | 0 322 106 A2 | 6/1989 |
| EP | 0 361 981 A2 | 4/1990 |
| EP | 0 453 033 A2 | 10/1991 |
| EP | 0 0671 650 | 9/1995 |
| EP | 0 793 214 A1 | 2/1996 |
| EP | 0 812 114 A1 | 12/1997 |
| EP | 0 878 969 | 11/1998 |
| EP | 0 899 604 A2 | 3/1999 |
| EP | 1 083 539 A2 | 3/2001 |
| EP | 1 261 014 A2 | 11/2002 |
| EP | 1 308 923 A1 | 5/2003 |
| GB | 2 133 912 A | 8/1984 |
| GB | 2 146 478 A | 4/1985 |
| GB | 2 282 928 A | 4/1995 |
| JP | 60-107022 | 6/1985 |
| JP | 62 127716 | 6/1987 |
| JP | 02-000826 A | 1/1990 |
| JP | 03-78390 | 4/1991 |
| JP | 03-036239 B | 5/1991 |
| JP | 06-102503 | 4/1994 |
| JP | 06-214250 | 8/1994 |
| JP | 11-014978 | 1/1999 |
| JP | 02-983027 B2 | 11/1999 |
| JP | 2004-004822 | 1/2004 |
| JP | 2004 078218 | 3/2004 |
| WO | WO 00/21067 | 4/2000 |
| WO | WO 00/42564 | 7/2000 |
| WO | WO 00/42762 | 7/2000 |
| WO | WO 00/45365 | 8/2000 |
| WO | WO 00/67196 | 11/2000 |
| WO | WO 00/70392 | 11/2000 |
| WO | WO 01/10112 A2 | 2/2001 |
| WO | WO 01/29817 A1 | 4/2001 |
| WO | WO 01/52546 A2 | 7/2001 |
| WO | WO 02/11112 A2 | 2/2002 |
| WO | WO 02/059685 A2 | 8/2002 |
| WO | WO 03/014819 A1 | 2/2003 |
| WO | WO 03/050605 A1 | 2/2003 |
| WO | WO 2003/050605 A1 | 2/2003 |
| WO | WO 2003/034380 A2 | 4/2003 |
| WO | WO 03/056383 A1 | 7/2003 |
| WO | WO 2003/056383 A1 | 7/2003 |
| WO | WO 2004/017129 | 2/2004 |
| WO | WO 2004/017129 A1 | 2/2004 |
| WO | WO 2004/021323 A2 | 3/2004 |
| WO | WO 2004/027503 A1 | 4/2004 |
| WO | WO 2004/086128 A1 | 10/2004 |
| WO | WO 2005/050296 A1 | 6/2005 |
| WO | WO 2005/057532 A2 | 6/2005 |

OTHER PUBLICATIONS

Credelle, Thomas L. et al., "P-00: MTF of High-Resolution PenTile Matrix™ Displays," *Eurodisplay 02 Digest*, 2002, pp. 1-4.

Daly, Scott, "Analysis of Subtriad Addressing Algorithms by Visual System Models," *SID Symp. Digest*, Jun. 2001, pp. 1200-1203.

Elliott, Candice H. Brown et al., "Color Subpixel Rendering Projectors and Flat Panel Displays," New Initiatives in Motion Imaging, SMPTE Advanced Motion Imaging Conference, Feb. 27- Mar. 1, 2003, Seattle, Washington, pp. 1-4.

Elliott, Candice H. Brown et al., "Co-optimization of Color AMLCD Subpixel Architecture and Rendering Algorithms," *SID Symp. Digest*, May 2002, pp. 172-175.

Feigenblatt, R.I., "Full-color imaging on amplitude-quantized color mosaic displays," *SPIE*, vol. 1075, Digital Image Processing Applications, 1989, pp. 199-204.

Johnston, Stuart J., "An Easy Read: Microsoft's ClearType," *InformationWeek Online*, Redmond, WA, Nov. 23, 1998, 3 pages.

Johnston, Stuart J., "Clarifying ClearType," *InformationWeek Online*, Redmond, WA, Jan. 4, 1999, 4 pages.

"Just Outta Beta," *Wired Magazine*, Dec. 1999, Issue 7.12, 3 pages.

Klompenhouwer, Michiel A. et al., "Subpixel Image Scaling for Color Matrix Displays," *SID Symp. Digest*, May 2002, pp. 176-179.

Markoff, John, "Microsoft's Cleartype Sets Off Debate on Originality," *The New York Times*, Dec. 7, 1998, 5 pages.

"Microsoft ClearType," http://www.microsoft.com/opentype/cleartype, Sep. 26, 2002, 4 pages.

Platt, John C., "Optimal Filtering for Patterned Displays," Microsoft Research, *IEEE Signal Processing Letters*, 2000, 4 pages.

Platt, John, "Technical Overview of CleatType Filtering," Microsoft Research, http://research.microsoft.com/users/jplatt/cleartype/default.aspx, Sep. 17, 2002, 3 pages.

Poor, Alfred, "LCDs: The 800-pound Gorilla," *Information Display*, Sep. 2002, pp. 18-21.

"Ron Feigenblatt's remarks on Microsoft ClearType™," http://www.geocities.com/SiliconValley/Ridge/6664/ClearType.html, Dec. 5, 1998, Dec. 7, 1998, Dec. 12, 1999, Dec. 26, 1999, Dec. 30, 1999, and Jun. 19, 2000, 30 pages.

"Sub-Pixel Font Rendering Technology," © 2003 Gibson Research Corporation, Laguna Hills, CA, 2 pages.

Werner, Ken, "OLEDs, OLEDs, Everywhere . . . ," *Information Display*, Sep. 2002, pp. 12-15.

Lee, Baek-woon et al., "40.5L: Late-News Paper: TFT-LCD with RGBW Color System," *SID 03 Digest*, 2003, pp. 1212-1215.

Brown Elliott, C, "Development of the PenTile Matrix™ Color AMLCD Subpixel Architecture and Rendering Algorithms", SID 2003, Journal Article.

Brown Elliott, C, "Pentile Matrix™ Displays and Drivers" ADEAC Proceedings Paper, Portland OR., Oct. 2005.

E-Reader Devices and Software, Jan. 1, 2001, Syllabus, http://www.campus-technology.com/article.asp?id=419.

Krantz, John et al., Color Matrix Display Image Quality: The Effects of Luminance . . . SID 90 Digest, pp. 29-32 , published in 1990.

Messing, Dean et al., Improved Display Resolution of Subsampled Colour Images Using Subpixel Addressing, IEEE ICIP 2002, vol. 1, pp. 625-628.

Messing, Dean et al., Subpixel Rendering on Non-Striped Colour Matrix Displays, 2003 International Conf on Image Processing, Sep. 2003, Barcelona, Spain, 4 pages.

PCT International Search Report dated Jun. 3, 2002 for PCT/US02/12610 (U.S. Appl. No. 10/051,612).

PCT International Search Report dated Jul. 17, 2003 for PCT/US02/39859 (U.S. Appl. No. 10/278,393).

PCT International Search Report dated Jul. 30, 2003 for PCT/US02/39860 (U.S. Appl. No. 10/278,328).

PCT International Search Report dated Sep. 30, 2003 for PCT/US02/24994 (U.S. Appl. No. 10/215,843).

PCT International Search Report dated Jun. 14, 2004 for PCT/US03/028222 (U.S. Appl. No. 10/243,094).

PCT International Search Report dated Nov. 3, 2004 for PCT/US04/18036 (U.S. Appl. No. 10/696,236).

USPTO, Notice of Allowance, dated Feb. 7, 2005 in US Patent No. 6,903,754 (U.S. Appl. No. 09/916,232).

Michiel A. Klompenhouwer, Gerard de Haan, Subpixel image scaling for color matrix displays, Journal of the Society for Information Display, vol. 11, Issue 1, Mar. 2003, pp. 99-108.

Adobe Systems, Inc., website, 2002, http://www.adobe.com/products/acrobat/cooltype.html.

Betrisey, C., et al., "Displaced Filtering for Patterned Displays," 2000, *Society for Information Display (SID) 00 Digest*, pp. 296-299.

Carvajal, D., "Bit Publishers Looking Into Digital Books," Apr. 3, 2000, *The New York Times*, Business/Financial Desk.

Elliott, C., "Active Matrix Display Layout Optimization for Sub-pixel Image Rendering," Sep. 2000, Proceedings of the 1st International Display Manufacturing Conference, pp. 185-189.

Elliott, C., "New Pixel Layout for PenTile Matrix," Jan. 2002, Proceedings of the International Display Manufacturing Conference, pp. 115-117.

Elliott, C., "Reducing Pixel Count without Reducing Image Quality," Dec. 1999, *Information Display*, vol. 15, pp. 22-25.

Gibson Research Corporation, website, "Sub-Pixel Font Rendering Technology, How It Works," 2002, http://www.grc.com/ctwhat.html.

Martin, R., et al., "Detectability of Reduced Blue Pixel Cont in Projection Displays," May 1993, *Society for Information Display (SID) 93 Digest*, pp. 606-609.

Microsoft Corportion, website, 2002, http://www.microsoft.com/reader/ppc/product/cleartype.html.

Microsoft Press Release, Nov. 15, 1998, Microsoft Research Announces Screen Display Breakthrough at COMDEX/Fall '98, PR Newswire.

Murch, M., "Visual Perception Basics," 1987, *SID*, Seminar 2, Tektronix, Inc., Beaverton, Oregon.

Okumura, H., et al., "A New Flicker-Reduction Drive Method for High-Resolution LCTVs," May 1991, *Society for Information Display (SID) International Symposium Digest of Technical Papers*, pp. 551-554.

Wandell, Brian A., Stanford University, "Fundamentals of Vision: Behavior, Neuroscience and Computation," Jun. 12, 1994, *Society for Information Display (SID) Short Course S-2*, Fairmont Hotel, San Jose, California.

USPTO, Non-Final Office Action, dated Mar. 9, 2004 in US Patent No. 6,903,754 (U.S. Appl. No. 09/916,232).

USPTO, Non-Final Office Action, dated May 6, 2004 in US Patent No. 6,903,754 (U.S. Appl. No. 09/916,232).

Clairvoyante Inc., Response to Non-Final Office Action, dated Sep. 3, 2004 in US Patent No. 6,903,754 (U.S. Appl. No. 09/916,232).

USPTO, Final Office Action, dated Jan. 6, 2005 in US Patent No. 6,903,754 (U.S. Appl. No. 09/916,232).

Clairvoyante Inc., Response to Final Office Action, dated Jan. 28, 2005 in US Patent No. 6,903,754 (U.S. Appl. No. 09/916,232).

* cited by examiner

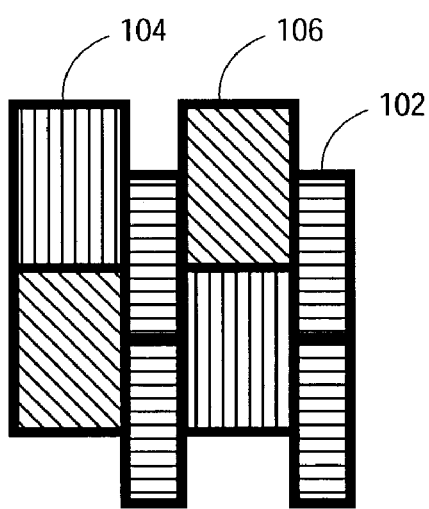 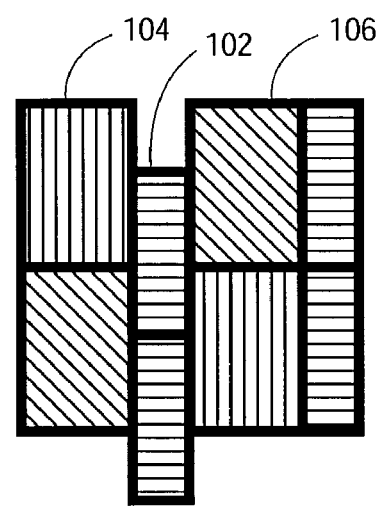
FIG. 18A     FIG. 18B

COLOR FLAT PANEL DISPLAY SUB-PIXEL ARRANGEMENTS AND LAYOUTS FOR SUB-PIXEL RENDERING WITH SPLIT BLUE SUB-PIXELS

RELATED APPLICATIONS

This application claims priority to U.S. Provisional Patent Application No. 60/346,738 ("the '738 provisional application"), entitled "ARRANGEMENT OF SUBPIXELS WITH DOUBLE BLUE STRIPES," filed on Jan. 7, 2002, which is hereby incorporated herein by reference.

This application is also related to United States Patent Publication No. 2003/0117423 ("the '423 application") [patent application Ser. No 10/278,328,] entitled "IMPROVEMENTS TO COLOR FLAT PANEL DISPLAY SUB-PIXEL ARRANGEMENTS AND LAYOUTS WITH REDUCED BLUE LUMINANCE WELL VISIBALITY," filed on Oct. 22, 2002; United States Patent Publication No. 2003/0090581 ("the '581 application") [U.S. patent application Ser. No. 10/278,393,] entitled "COLOR DISPLAY HAVING HORIZONTAL SUB-PIXEL ARRANGEMENTS AND LAYOUTS," filed on Oct 22, 2002; and United States Patent Publication No. 2003/0128225 ("the '225 application") [U.S. patent application Ser. No. 10/278,353,] entitled "IMPROVEMENTS TO COLOR FLAT PANEL DISPLAY SUB-PIXEL ARRANGEMENTS AND LAYOUTS FOR SUB-PIXEL RENDERING WITH INCREASED MODULATION TRANSFER FUNCTION RESPONSE," filed on Oct. 22, 2002, which are all hereby incorporated herein by reference and commonly owned by the same assignee of this application.

BACKGROUND

The present application relates to improvements to display layouts, and, more particularly, to improved color pixel arrangements, means of addressing used in displays, and to data format conversion methods for these displays.

Full color perception is produced in the eye by three-color receptor nerve cell types called cones. The three types are sensitive to different wavelengths of light: long, medium, and short ("red", "green", and "blue", respectively). The relative density of the three differs significantly from one another. There are slightly more red receptors than green receptors. There are very few blue receptors compared to red or green receptors.

The human vision system processes the information detected by the eye in several perceptual channels: luminance, chrominance, and motion. Motion is only important for flicker threshold to the imaging system designer. The luminance channel takes the input from only the red and green receptors. In other words, the luminance channel is "color blind." It processes the information in such a manner that the contrast of edges is enhanced. The chrominance channel does not have edge contrast enhancement. Since the luminance channel uses and enhances every red and green receptor, the resolution of the luminance channel is several times higher than the chrominance channels. Consequently, the blue receptor contribution to luminance perception is negligible. The luminance channel thus acts as a resolution band pass filter. Its peak response is at 35 cycles per degree (cycles/°). It limits the response at 0 cycles/° and at 50 cycles/° in the horizontal and vertical axis. This means that the luminance channel can only tell the relative brightness between two areas within the field of view. It cannot tell the absolute brightness. Further, if any detail is finer than 50 cycles/°, it simply blends together. The limit in the horizontal axis is slightly higher than the vertical axis. The limit in the diagonal axes is significantly lower.

The chrominance channel is further subdivided into two sub-channels, to allow us to see full color. These channels are quite different from the luminance channel, acting as low pass filters. One can always tell what color an object is, no matter how big it is in our field of view. The red!green chrominance sub-channel resolution limit is at 8 cycles/°, while the yellow/blue chrominance sub-channel resolution limit is at 4 cycles/°. Thus, the error introduced by lowering the red/green resolution or the yellow/blue resolution by one octave will be barely noticeable by the most perceptive viewer, if at all, as experiments at Xerox and NASA, Ames Research Center (see, e.g., R. Martin, J. Gille, J. Larimer, Detectability of Reduced Blue Pixel Count in Projection Displays, SID Digest 1993) have demonstrated.

The luminance channel determines image details by analyzing the spatial frequency Fourier transform components. From signal theory, any given signal can be represented as the summation of a series of sine waves of varying amplitude and frequency. The process of teasing out, mathematically, these sine-wave-components of a given signal is called a Fourier Transform. The human vision system responds to these sine-wave-components in the two-dimensional image signal.

Color perception is influenced by a process called "assimilation" or the Von Bezold color blending effect. This is what allows separate color pixels (also known as sub-pixels or emitters) of a display to be perceived as a mixed color. This blending effect happens over a given angular distance in the field of view. Because of the relatively scarce blue receptors, this blending happens over a greater angle for blue than for red or green. This distance is approximately 0.25° for blue, while for red or green it is approximately 0.12°. At a viewing distance of twelve inches, 0.25° subtends 50 mils (1,270 μ) on a display. Thus, if the blue pixel pitch is less than half (625 μ) of this blending pitch, the colors will blend without loss of picture quality. This blending effect is directly related to the chrominance sub-channel resolution limits described above. Below the resolution limit, one sees separate colors, above the resolution limit, one sees the combined color.

BRIEF DESCRIPTION OF THE DRAWINGS

The accompanying drawings, which are incorporated in, and constitute a part of this specification illustrate various implementations and embodiments.

FIGS. 18A and 18B show other embodiments of the octal subpixel arrangement with various vertical displacements of the subpixels.

DETAILED DESCRIPTION

Reference will now be made in detail to various implementations and embodiments, examples of which are illustrated in the accompanying drawings. Wherever possible, the same reference numbers will be used throughout the drawings to refer to the same or like parts.

Figure 1:
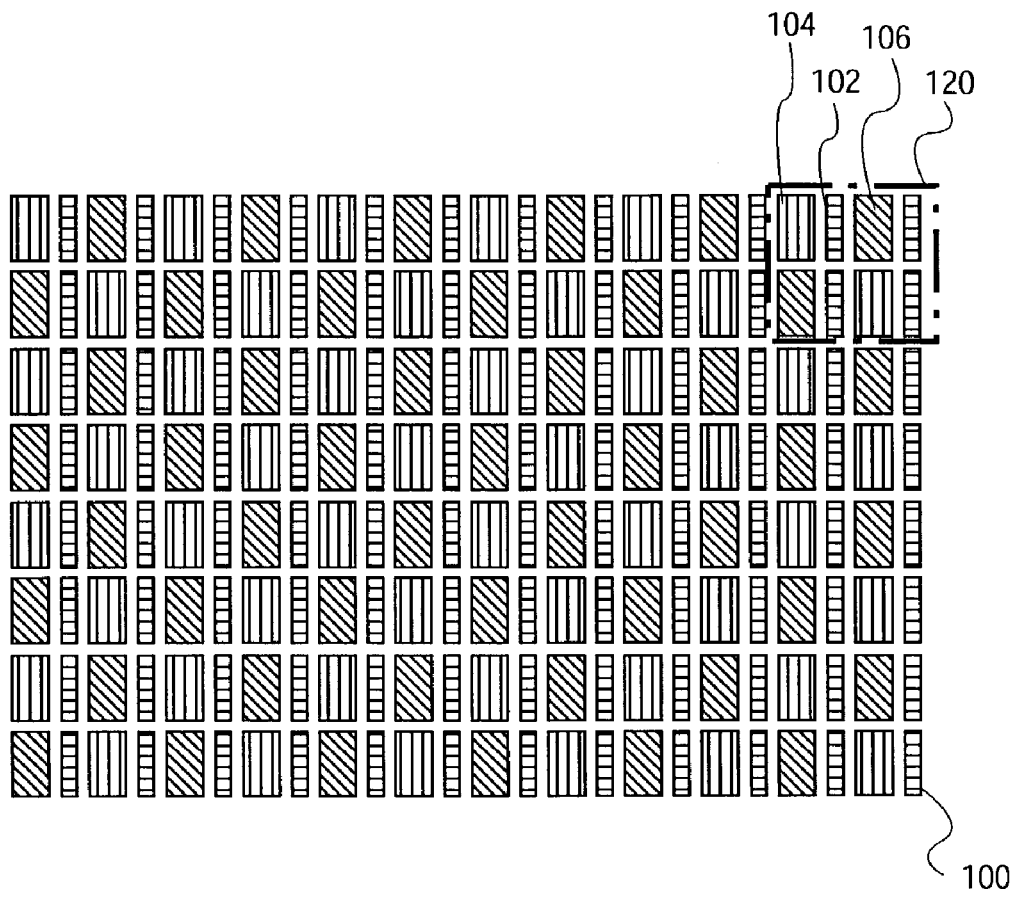
FIG. 1 shows an arrangement of sub-pixel emitters comprising three colors—red, green, and blue—in a grouping that creates a larger rectilinearly repeating cell group of eight sub-pixels wherein the blue sub-pixels are "split".

In FIG. 1, in the arrangement of sub-pixel emitters 100, there are sub-pixel emitters in three colors in grouping 120 that create a larger rectilinearly repeating cell group of eight sub-pixels. This layout was introduced in the '738 provisional application and included herein by reference. Grouping 120 comprises red sub-pixels 104 illustrated by vertical cross-hatching, green sub-pixels 106 illustrated by diagonal cross-hatching, and blue sub-pixels 102 illustrated by horizontal cross-hatching. As may be seen, blue sub-pixels 102 are "split"—i.e. having a smaller width along the horizontal axis than either red or green sub-pixels but doubled in number per grouping or repeat cell. Such a "split" sub-pixel can refer to a sub-pixel having a smaller area than a non-split sub-pixel. Splitting the blue sub-pixels helps in breaking up the noticeable effect of visible vertical blue stripes down the display, as further discussed in United States Publication No. 2003/0117423 ("the '423 application") [U.S. patent application Ser. No. 10/278,328 entitled "IMPROVEMENTS TO COLOR FLAT PANEL DISPLAY SUB-PIXEL ARRANGEMENTS AND LAYOUTS WITH REDUCED BLUE LUMINANCE WELL VISIBILITY," filed on Oct. 22, 2002, incorporated by reference.

As may additionally be seen in FIG. 1, the red and the green sub-pixels are placed upon a "checkerboard" pattern within the repeat cell itself. As discussed further in the '225 application, it may be desirable to alter the color assignments in repeat cell grouping 120 to have split green sub-pixels in positions of sub-pixels 102 and have the remaining red and blue sub-pixels form the checkerboard pattern. Likewise, it might be desirable to have the red sub-pixels split and the green and blue sub-pixels on a checkerboard pattern. The alternating "checkerboard" of emitters is similar to the red and green "checkerboard" that was disclosed in co-pending and commonly assigned United States Patent Publication No. 2002/0015110 ("the '110 application") [U.S. patent application Ser. No. 09/916,232, ] entitled "ARRANGEMENT OF COLOR PIXELS FOR FULL COLOR IMAGING DEVICES WITH SIMPLIFIED ADDRESSING," filed on Jul. 25, 2001, which is hereby incorporated herein by reference.

It should be appreciate that while FIG. 1 depicts the "split" blue subpixel as narrower than either the red or the green subpixels, another embodiment of the present invention employs blue subpixels of equal area dimensions to the red and green subpixels. To achieve a pleasing white point with all subpixels on in a logical pixel, the relative intensities of the red, green and blue emitters can be changed appropriately as discussed in co-pending and commonly assigned United States Patent Publication No. 2004/0051724 ("the '724 application") [U.S. patent application Ser. No. 10/243,094,] entitled "IMPROVED FOUR COLOR ARRANGEMENTS OF EMITTERS FOR SUBPIXEL RENDERING," filed Sep. 13, 2002, which is hereby incorpated herein by reference.

As shown in FIG. 1, the subpixels appear to have a substantially rectangular appearance. It should be appreciated that other shapes to the subpixels are also possible and are contemplated within the scope of the present invention. For example, a multitude of other regular or irregular shapes for the subpixels are possible and are desirable if manufacturable. It suffices only that there is an octal grouping of colored subpixels in the fashion herein described that may be addressable for the purposes of subpixel rendering (SPR).

As subpixel shapes may vary under the scope of the present invention, so too may the exact positions of the subpixels be varied under the scope of the present invention. For example, FIGS. 18A and 18B depict a similar octal subpixel grouping wherein one or both of the majority stripes 102 are offset (relatively or otherwise) from the other subpixels 104 and 106. Other vertical offsets are also possible.

Figure 19A:
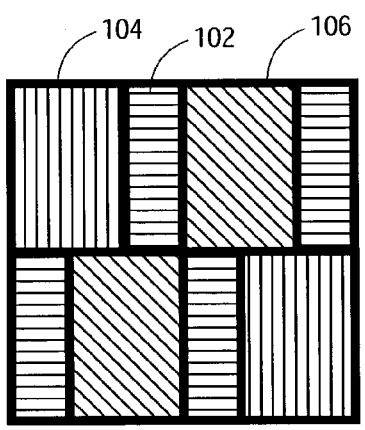
FIGS. 19A and 19B show yet other embodiments of the octal subpixel arrangement of various displacements of the split majority subpixel within the subpixel grouping.
Figure 19B:
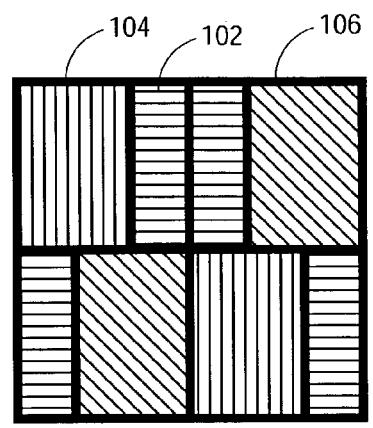

Other embodiments of the octal groupings are also possible. FIGS. 19A and 19B depict octal groupings wherein the majority subpixels 102 are interspersed within the checkerboard of subpixels 104 and 106. Other arrangements of majority subpixel placement within such a checkerboard are also possible and are contemplated within the scope of the present invention.

FIGS. 19A and 19B may have column electrodes that zig-zag across the display. Column driver savings should be one third when compared to the RGB stripe system with the same resolution and the number of subpixels are about two thirds of the number of subpixels when compared to the RGB stripe system.

Yet other embodiments of the present invention are possible. For example, the entire octal subpixel groupings may be rotated 90 degrees to reverse the roles of row and column driver connections to the grouping. Such a horizontal arrangement for subpixels is further disclosed in the co-pending and commonly assigned application United States Patent Publication No. 2003/0090581 ("the '581 application") entitled "COLOR DISPLAY HAVING HORIZONTAL SUB-PIXEL ARRANGEMENTS AND LAYOUTS," incorporated by reference.

The alternating "checkerboard" of emitters is similar to the red and green "checkerboard" that was disclosed in co-pending United States Patent Publication No. 2002/0015110 ("the '110 application") [U.S. patent application Ser. No. 09/916, 232] entitled "ARRANGEMENT OF COLOR PIXELS FOR FULL COLOR IMAGING DEVICES WITH SIMPLIFIED ADDRESSING," filed on Jul. 25, 2001 and hereby incorporated herein by reference.

With the display comprised substantially of repeat cell 120 having the blue sub-pixel split as sub-pixel 102, it is possible to perform sub-pixel rendering upon this display using the area resampling techniques as described in United States Patent Publication No. 2003/0103058 ("the '058 application") [U.S. patent application Ser. No. 10/150,355] entitled "METHODS AND SYSTEMS FOR SUB-PIXEL RENDERING WITH GAMMA ADJUSTMENT," filed on May 17, 2002, which is hereby incorporated herein by reference and is commonly owned by the same assignee of this application. One such embodiment of area resampling is shown in FIGS. 2 through 7.

Figure 2:
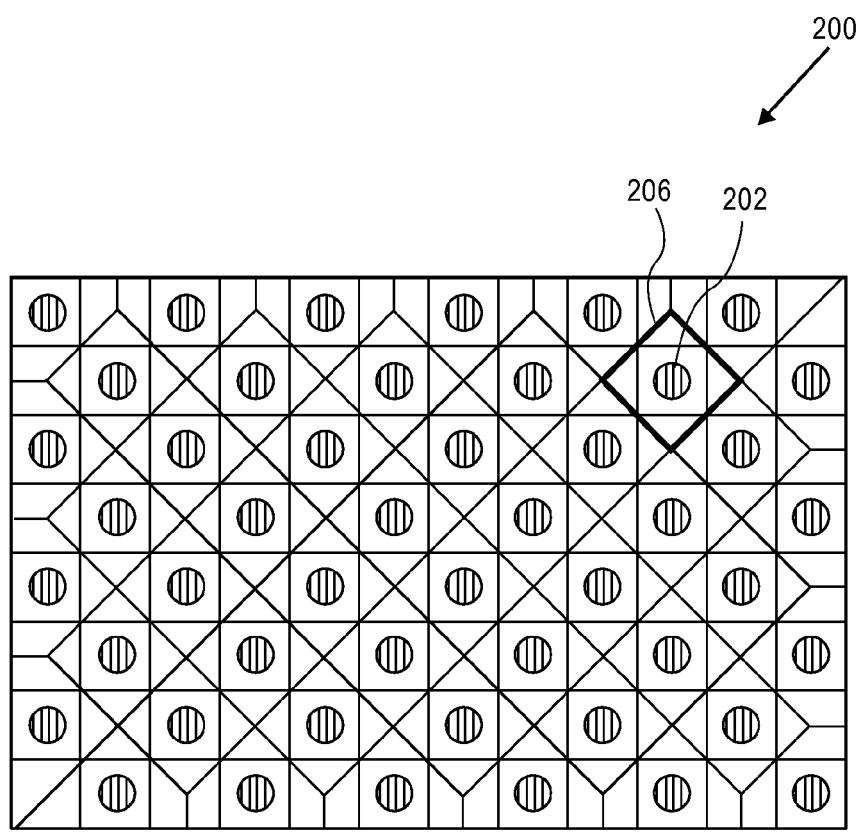
FIGS. 2, 3 and 4 illustrate one embodiment of red, green, and blue resample area arrays for the red, green and blue color planes respectively to match the sub-pixel arrangement of FIG. 1.
Figure 3:
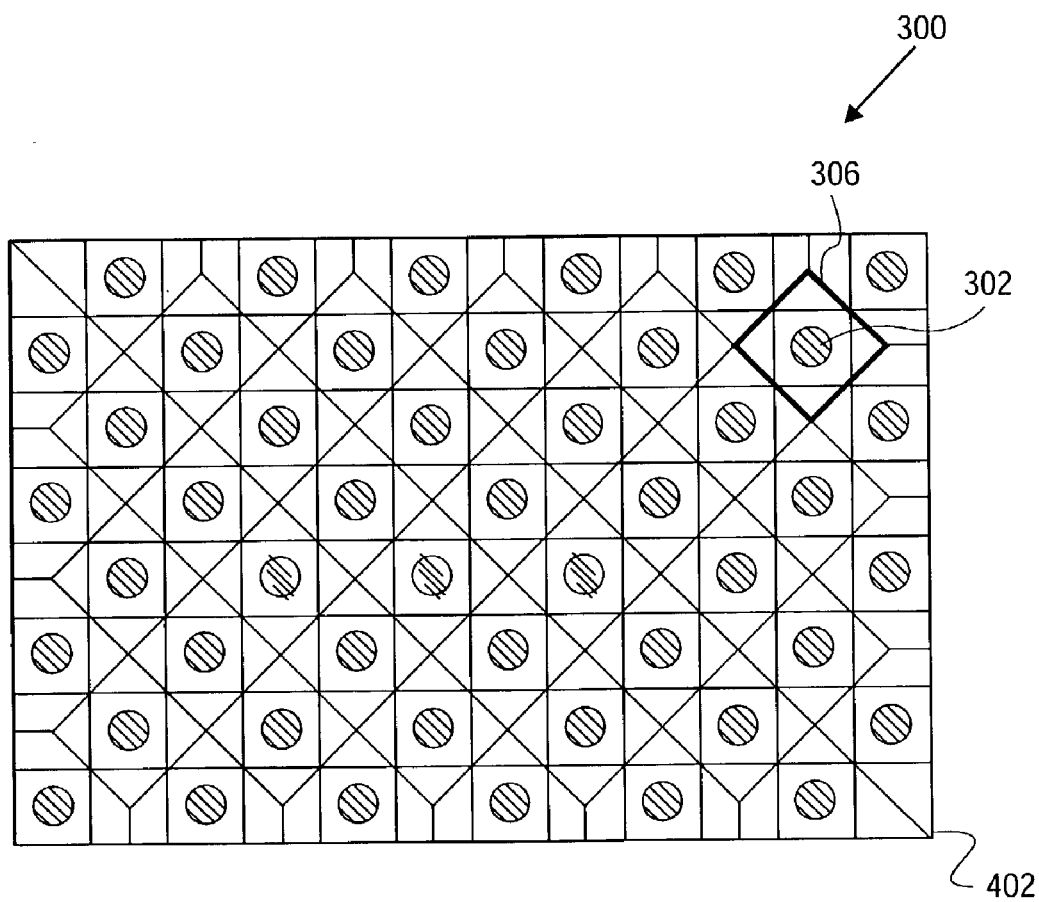
Figure 4:
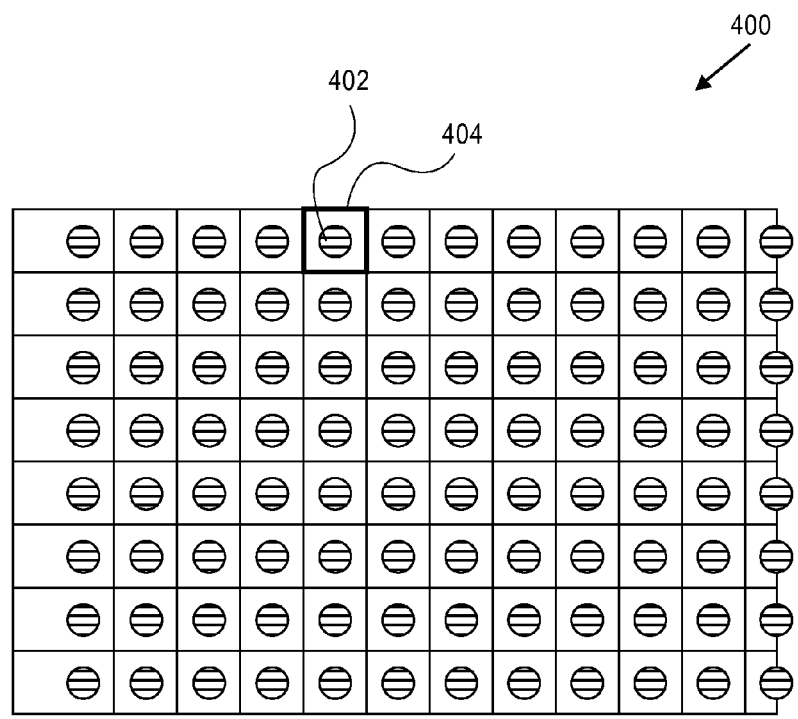

FIGS. 2, 3 and 4 illustrate red 200, green 300, and blue 400 resample area arrays for the red, green and blue color planes, respectively. Each color resample area array 200, 300, and 400 comprises resample areas 206, 306 and 404, respectively, and that each resample area has an associated resample point 202, 302 and 402, respectively. The resample points 202, 302, and 402 match the relative positions of the red 104, green 106 and blue 102 sub-pixel locations, respectively, within each color plane; but not necessarily their exact inter-color-plane-phase relationships. Any number of phase relationships are possible, a number of which have useful properties in given data format conversion cases.

Figure 5:
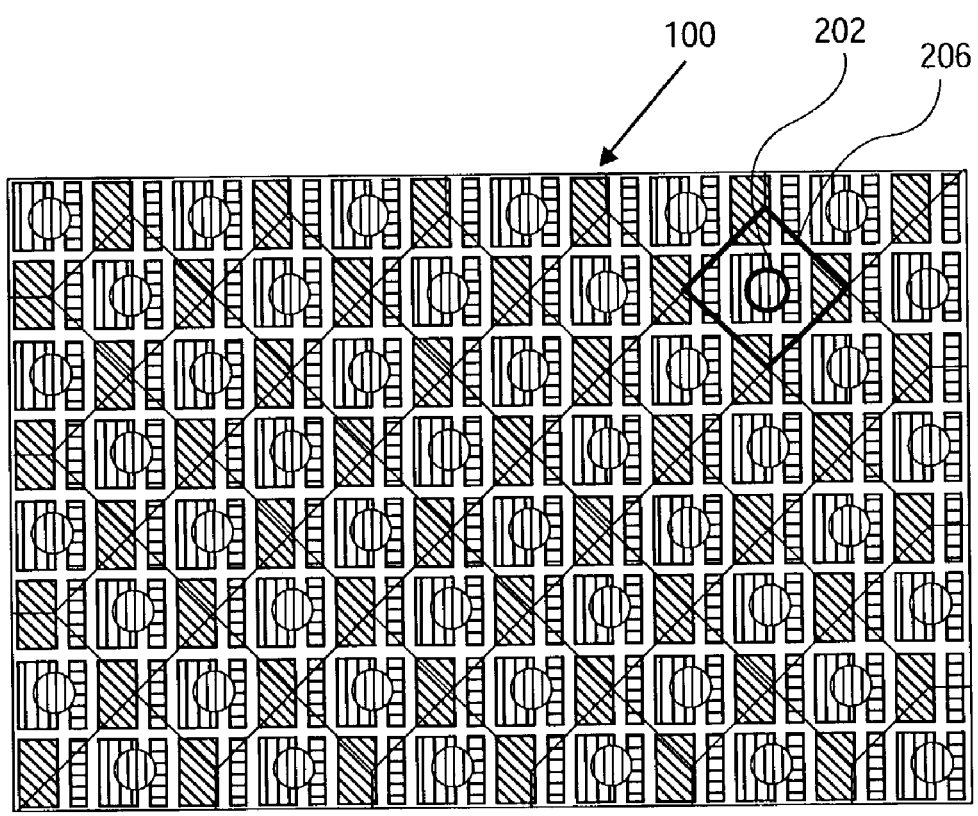
FIGS. 5 and 6 illustrate the red and green resample area arrays of FIGS. 2 and 3 overlaid on the sub-pixel arrangement of FIG. 1 respectively.
Figure 6:
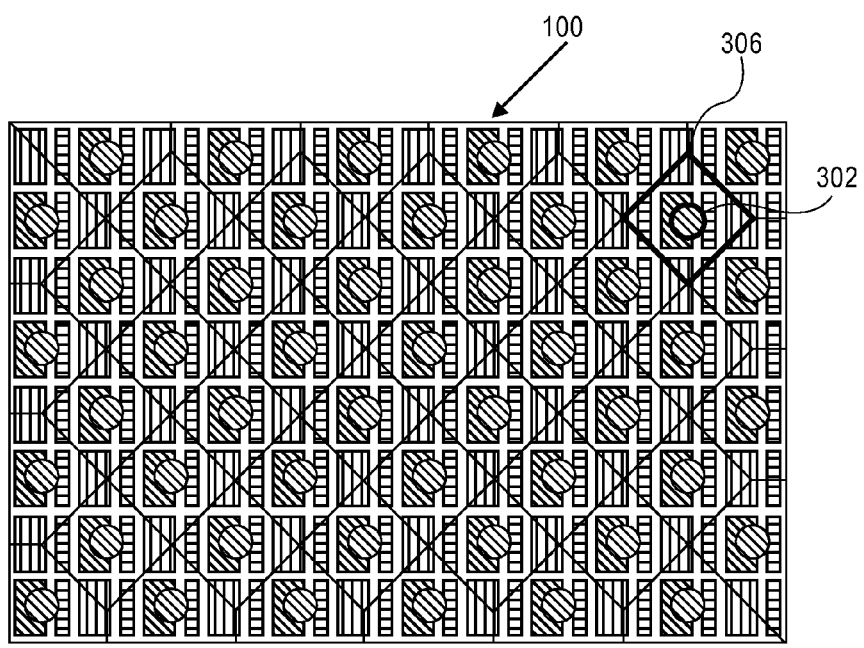
Figure 7:
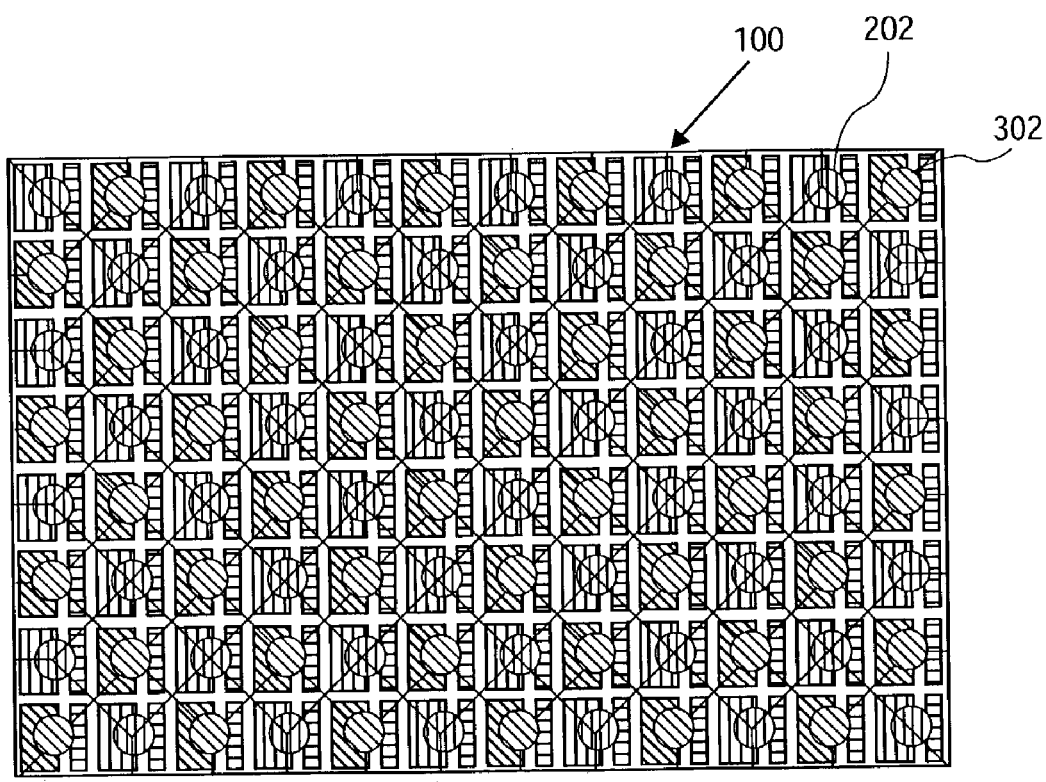
FIG. 7 illustrates one particular inter-color-plane-phase relationship between the red and green color resample areas overlaid on the sub-pixel arrangement of FIG. 1.

FIG. 5 illustrates red resample area array 200 of FIG. 2 overlaid on the sub-pixel arrangement 100 of FIG. 1. FIG. 6 illustrates the green resample area array 300 of FIG. 3 overlaid on the sub-pixel arrangement 100 of FIG. 1. FIG. 7 illustrates one particular inter-color-plane-phase relationship between red color resample area array 200 and green color resample area array 300 when both arrays are overlaid on the sub-pixel arrangement 100. This particular inter-color-plane-phase relationship depicts converting the conventional fully converged square grid red-green-blue RGB format which is to be displayed "one-to-one" with the square blue 102 sub-pixel grid. In this inter-color-plane-phase relationship, green resample area array 300 of FIG. 3, blue resample area array 400 of FIG. 4, and red resample area array 200 resample area arrays of FIG. 2 are positioned such that the red resample points 202 and green resample points 302 overlap the blue resample points 402 (which are not called out in FIG. 7). This treats the blue sub-pixels 102 as though they lay on top of, or are intimately associated with, the red and green sub-pixel checkerboard.

Figure 11:
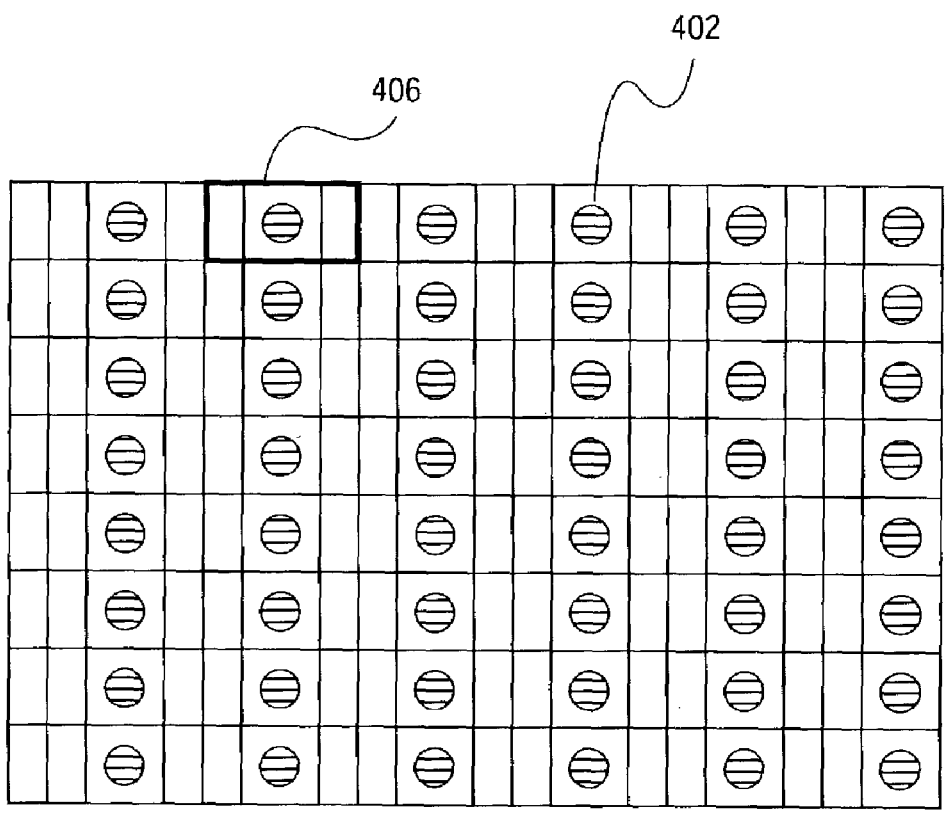
FIGS. 11 and 13 each depict an alternative blue color plane resample area array that may be used in place of the one shown in FIG. 4.
Figure 12:
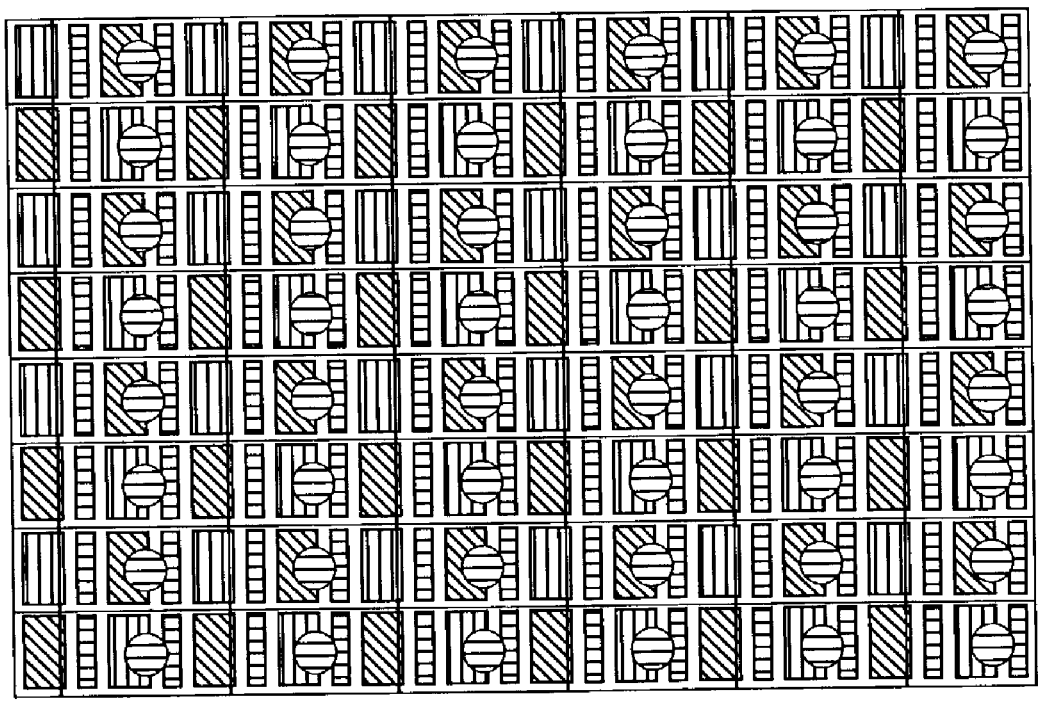
FIGS. 12 and 14 show how the respective blue color plane resample areas of FIGS. 11 and 13 would map onto the sub-pixel layout as shown in FIG. 1.
Figure 13:
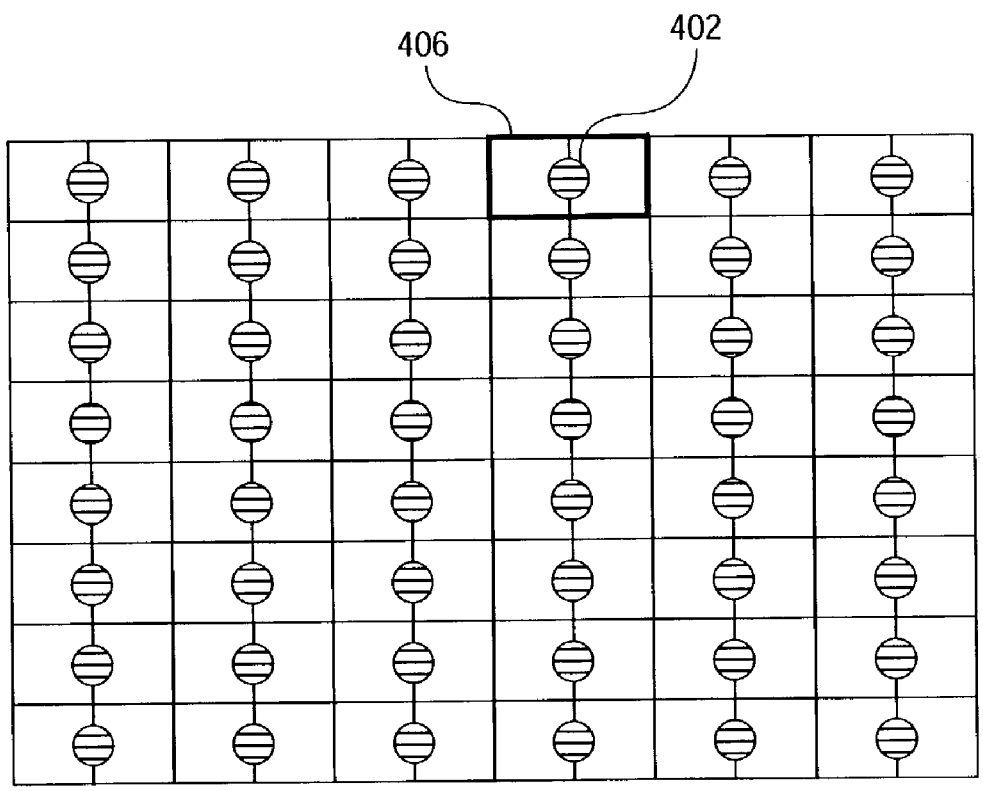
Figure 14:
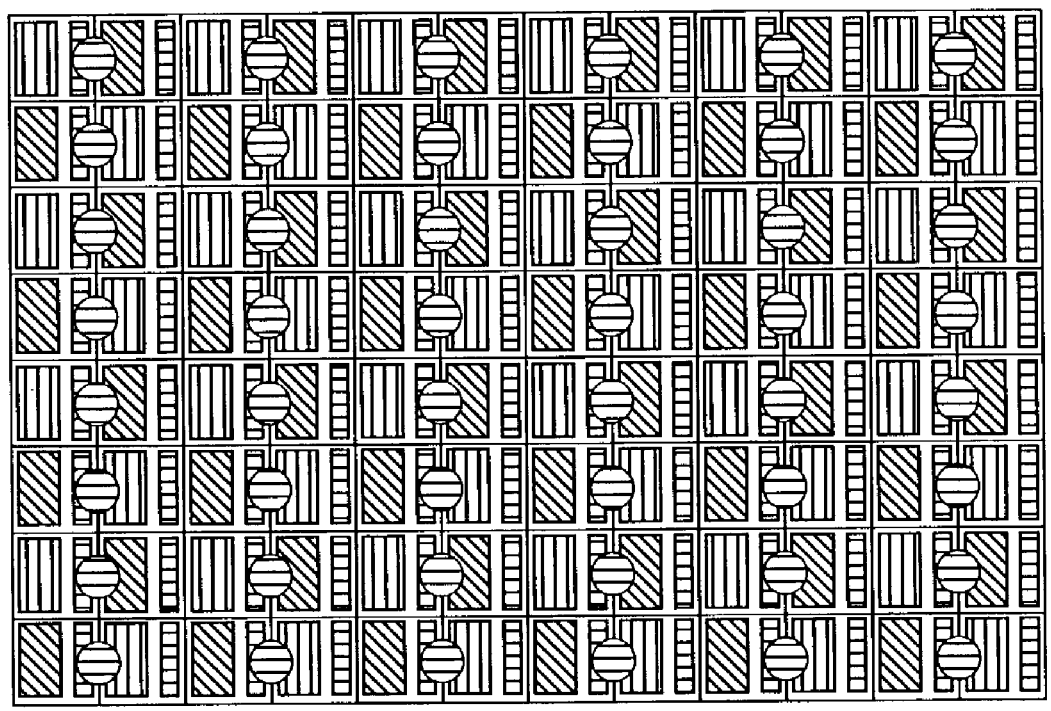

FIGS. 11 and 13 each depict a blue color plane resample area array that may be used in place of the one shown in FIG. 4. FIGS. 12 and 14 show how these respective blue color plane resample area arrays would map onto the sub-pixel in arrangement 100 of FIG. 1. FIGS. 11 and 13 depict two different embodiments of resample areas 406 for blue with the phase shift shown. It should be appreciated that other phase shifts suffice for the purposes of the present invention. Additionally, other resample areas for the blue pixel data could be employed without departing from the scope of the present invention.

These Figures are merely illustrative and only serve to provide an understanding of the relationship between the resample points, reconstruction points, resample areas, and sub-pixel locations for this embodiment.

The sub-pixel rendering techniques as described in the '058 patent application can be used to convert the incoming data format to the format suitable for the display having the sub-pixel arrangement 100 of FIG. 1. In such a case, the method proceeds as follows: (1) determining implied sample areas for each data point of incoming three-color pixel data; (2) determining the resample area for each color sub-pixel in the display; (3) forming a set of coefficients for each said resample area, the coefficients comprising fractions whose denominators are a function of the resample area and whose numerators are a function of an area of each implied sample area that may partially overlap the resample area; (4) multiplying the incoming three-color pixel data for each implied sample area by the coefficient resulting in a product; and (5) adding each product to obtain a luminance value for each resample area.

Other sub-pixel rendering techniques are possible to employ with the various sub-pixel arrangements as disclosed herein. For example, the techniques known as "adaptive filtering" may be employed in the same fashion as described in United States Patent Publication No. 2003/0085906 ("the '906 application") [U.S. patent application Ser. No. 10/215, 843,] entitled "METHODS AND SYSTEMS FOR SUB-PIXEL RENDERING WITH ADAPTIVE FILTERING," filed on Aug. 8, 2002, which is hereby incorporated herein by reference and commonly owned by the same assignee of this application. Adaptive filtering can be adopted so as not to require a 3×3 sample of input data, which uses a minimum of two lines of memory. The test may be based on a smaller sample of input data, for example 1×3 or 1×2 matrices. The input data is sampled to test for vertical or diagonal lines, dots and edges, or other high contrast features and then actions are taken, depending on the outcome of the tests.

Test masks may be used and compared to the image data to see if an edge is detected; if detected then take an appropriate action to the red and/or blue data—e.g. apply gamma or apply a new value or different filter coefficient. Otherwise, if no feature is detected, then no action may be taken.

Figure 17:
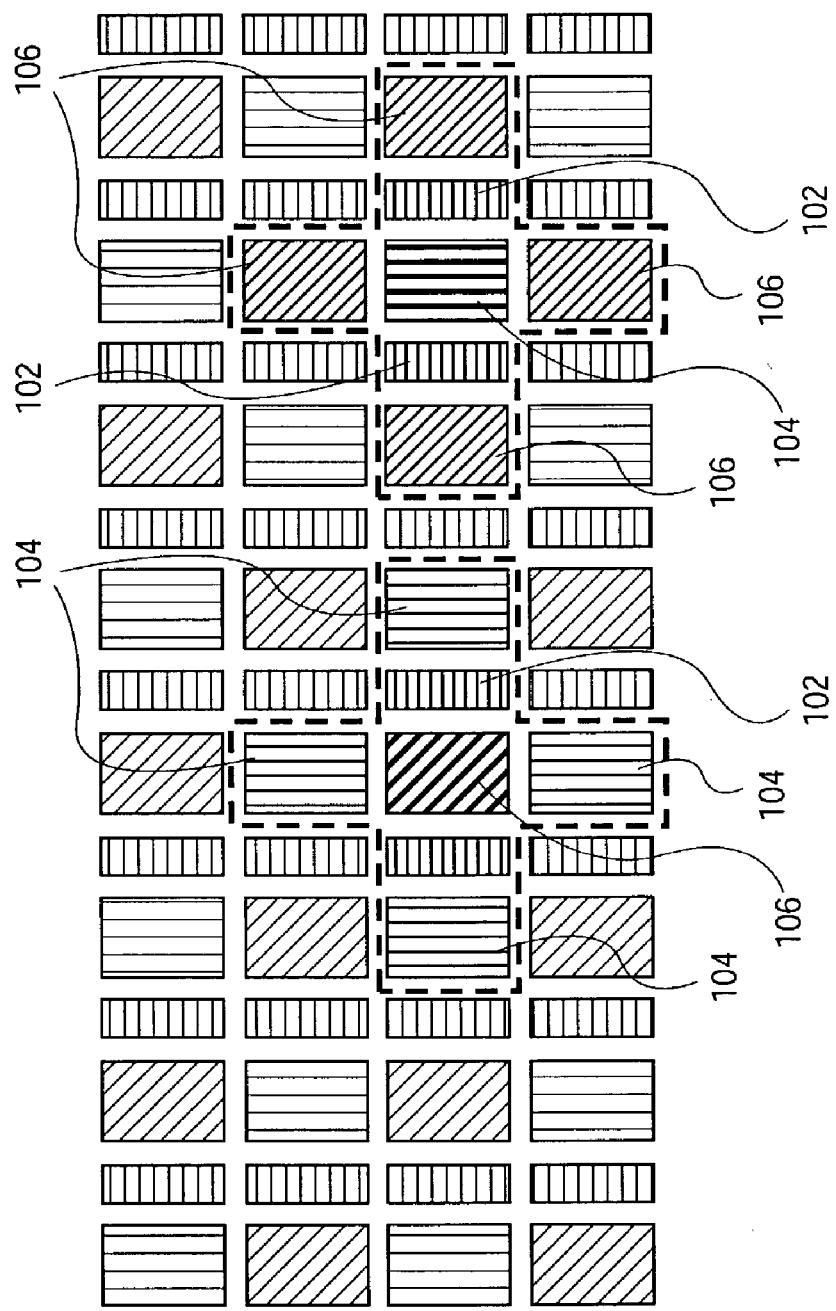
FIG. 17 illustrates the results of turning on two full color incoming data pixels.

FIG. 17 illustrates the results of turning on two full color incoming data pixels. The two pixels are converted to two clusters of sub-pixels, called "logical pixels", turned on at varying amplitudes. The logical pixel bounded by dashed lines on the left is centered on or near a green sub-pixel 106. The logical pixel bounded by dashed lines on the right is centered on or near a red sub-pixel 104. In both logical pixels, the various sub-pixels are turned on to the appropriate illumination such that a pleasing white color is formed and centered on the green and red sub-pixels, respectively.

Figure 8A:
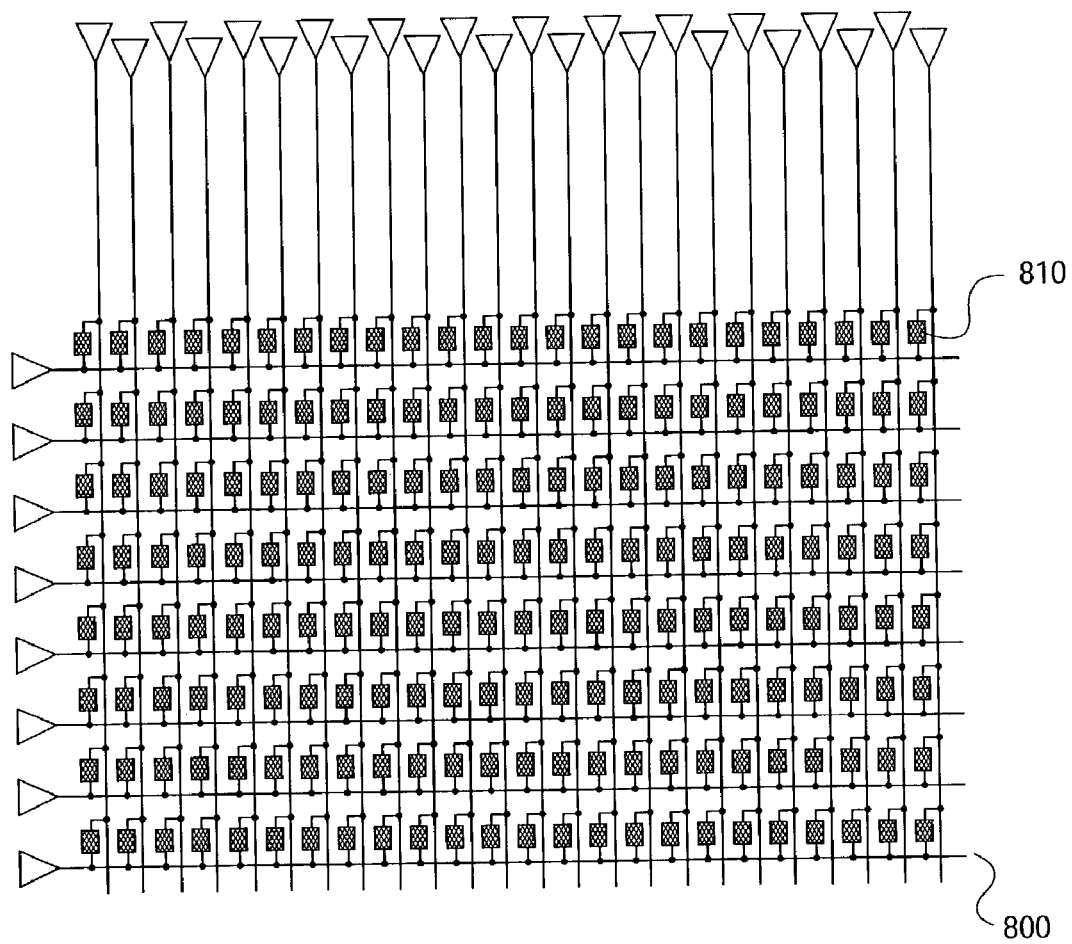
FIGS. 8A and 8B illustrate two possible schematics for a driver arrangement for the arrangement of color emitter sub-pixels in FIG. 1.
Figure 8B:
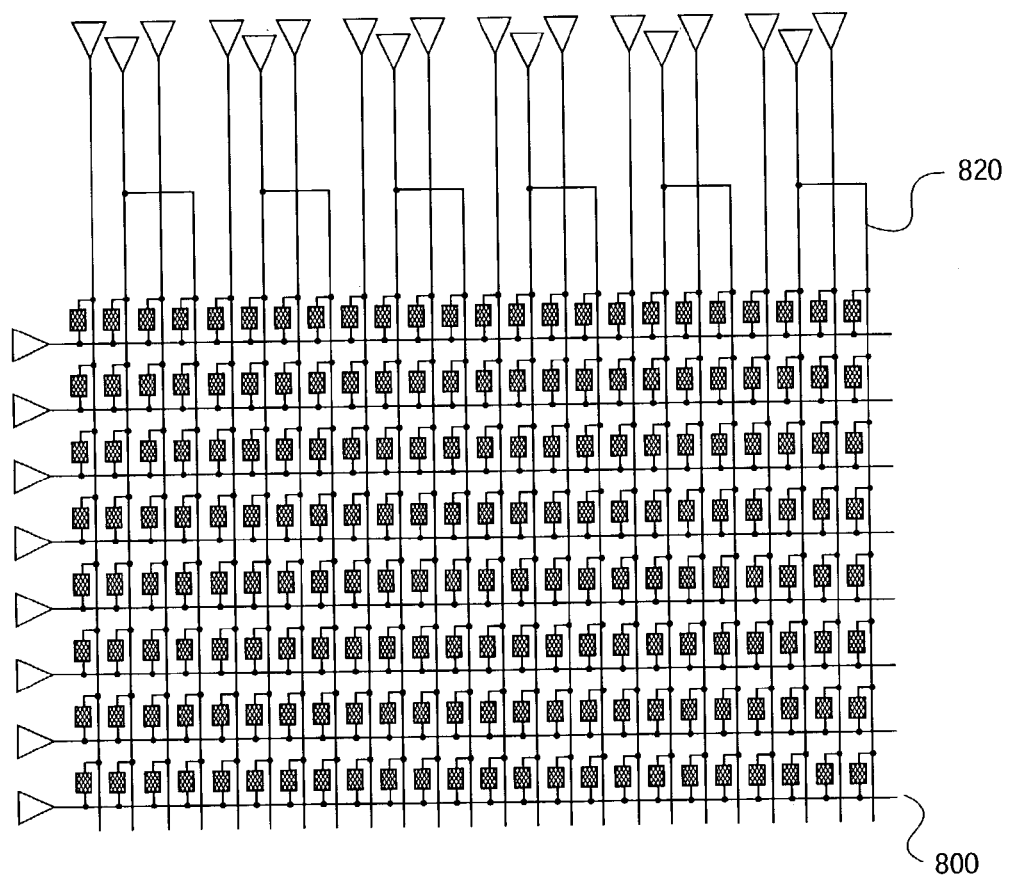

FIGS. 8A and 8B illustrate two possible schematics for a driver arrangement 800 for the arrangement of color emitter sub-pixels in FIG. 1. FIG. 8A shows a one to one correspondence of column drivers to columns in the display; however, with the split blue sub-pixels, it may be desirable to tie adjacent columns of split blue sub-pixels via connections 820. As may be seen in FIG. 8B, this scheme has the advantage of saving on the number of column drivers.

For convenience, these examples given have the same number of sub-pixels illustrated as FIG. 1. These drive arrangements may be used for a number of display technologies, as the blocks 810 may represent one or several electrical components. They may represent the capacitive display cell element for passively addressed Liquid Crystal Display (LCD), or ElectroLuminescent (EL) Display. It may represent the gaseous discharge element in a Plasma Display Panel (PDP). It may represent the semiconductor diode element of a passively Inorganic Light Emitting Diode or an Organic Light Emitting Diode Display. It may represent the transistor, storage capacitor, and capacitive cell element of an Active Matrix Liquid Crystal Display (AMLCD). It may represent the multi-transistor, storage capacitor, and light emitting element of an Active Matrix Organic Light Emitting Diode Display (AMOLED). It may represent, in general, the color sub-pixel and its associated electronic elements found in other known or yet to be invented display technologies.

Known drive timing and methods may be used for N×M drive matrices as those shown. However, there may be modifications needed due to the specific color assignments, particularly any checkerboard across the panel or color alternations within a single column. For example, the technique known in the art as Multi-Line Addressing for passive LCD may be modified such that groupings of rows are restricted to odd and even row combinations. This will reduce potential color cross talk since, within a column with two alternating color sub-pixels, only one color will be addressed at a time.

Figure 9:
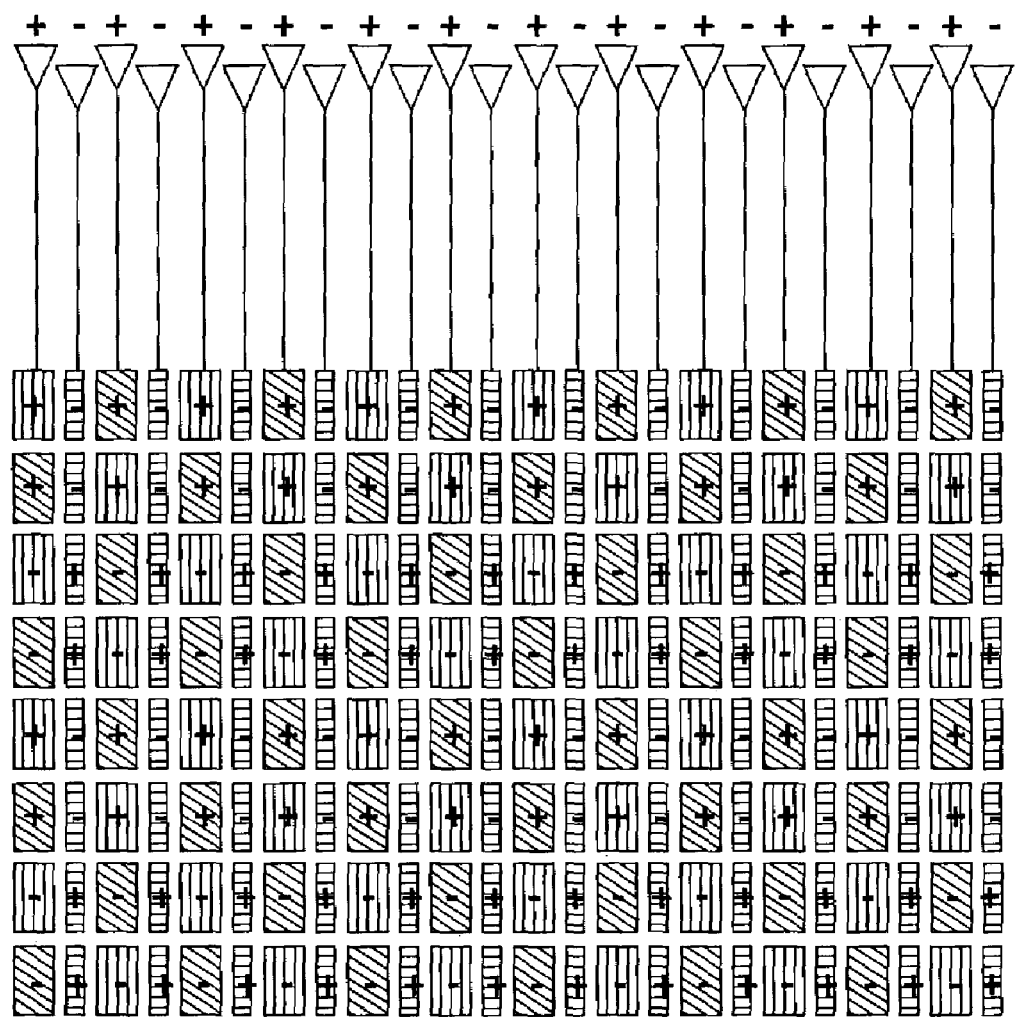
FIGS. 9 and 10 show two "dot inversion" schemes—commonly known as "2×1" and "1×1", respectively—matching FIG. 8A's schematic.
Figure 10:
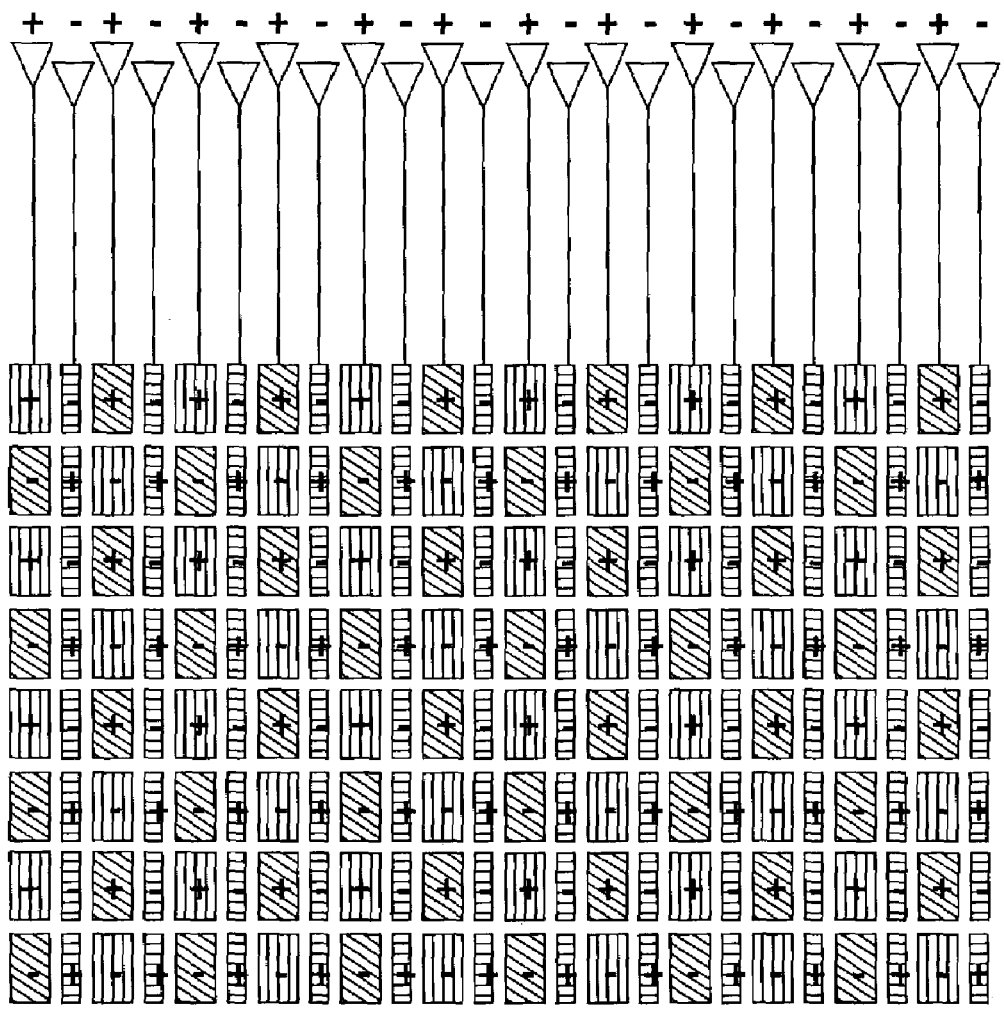
Figure 15:
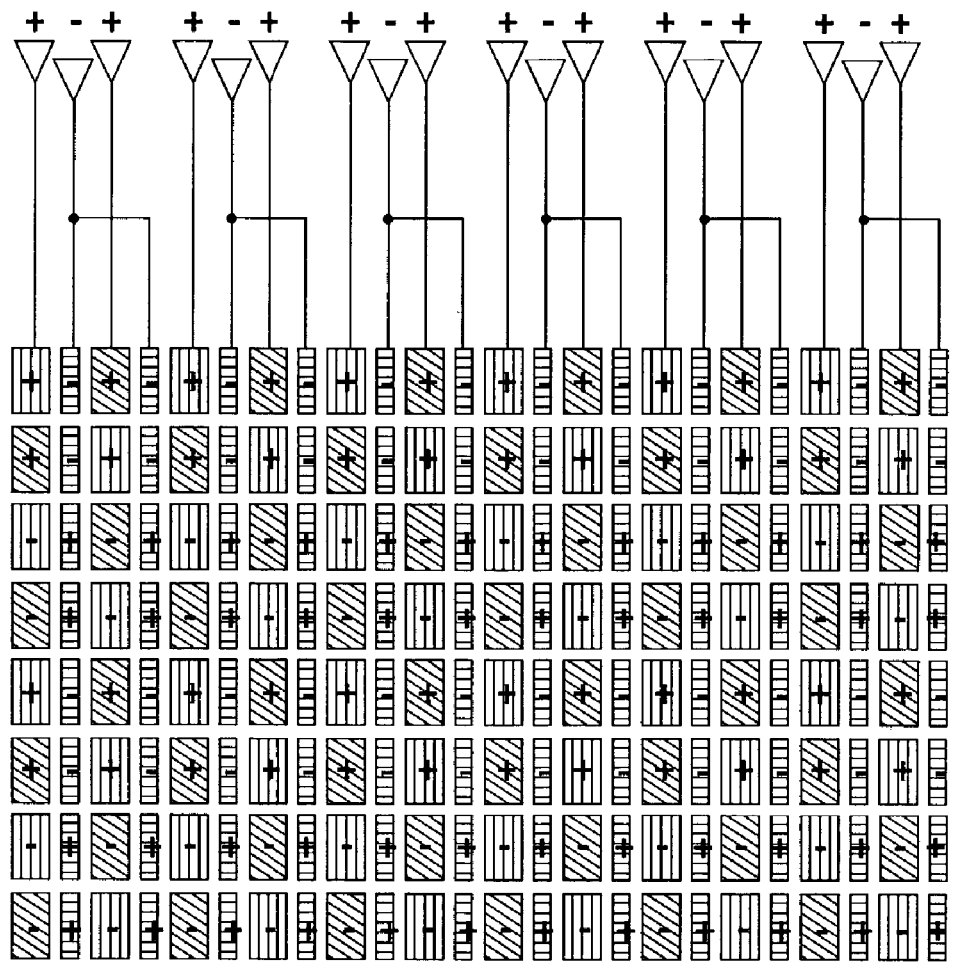
FIGS. 15 and 16 show two "dot inversion" schemes—commonly known as "2×1" and "1×1", respectively—matching FIG. 8B's schematic.
Figure 16:
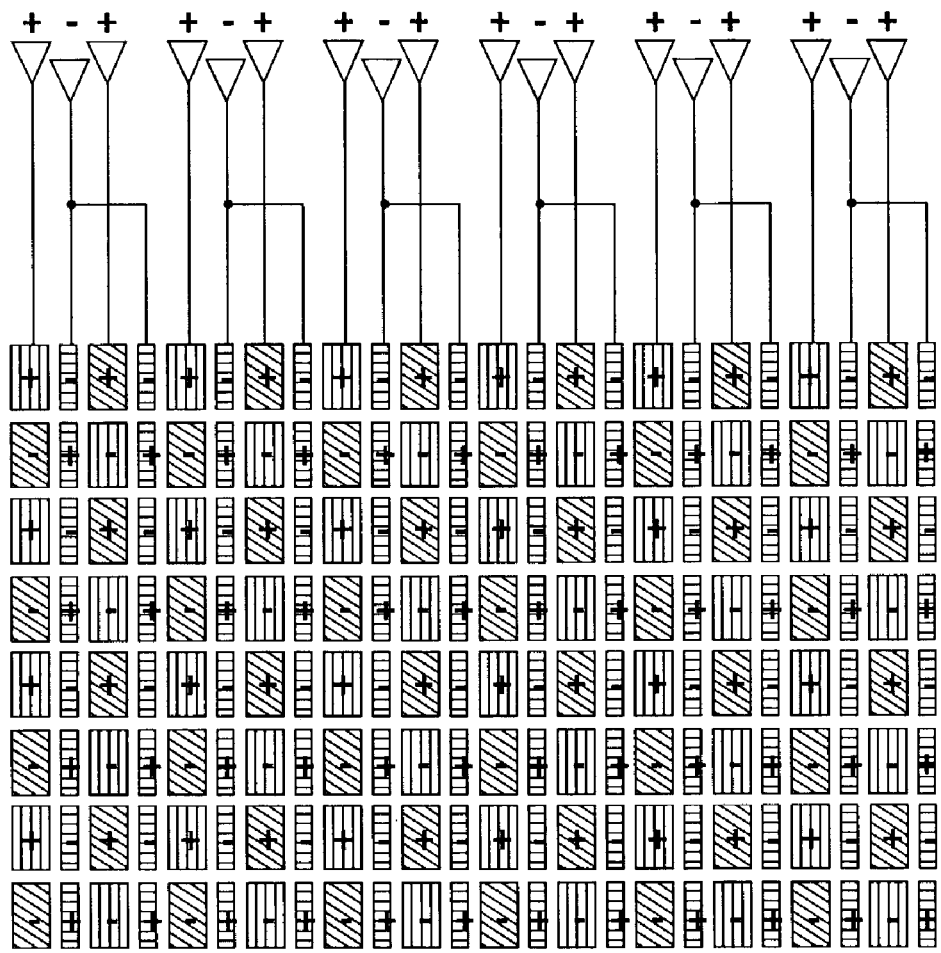

Inversion schemes, switching the electrical field polarity across the display cell to provide a time averaged zero net field and ion current across the cell can be used to the above unique sub-pixel arrangements. FIGS. 9 and 10 (matching FIG. 8A's schematic) and FIGS. 15 and 16 (matching FIG. 8B's schematic) show two "dot inversion" schemes—referred to as "2×1" and "1×1", respectively—on Active Matrix Liquid Crystal Displays, both of which will perform satisfactorily. The scheme shown on FIGS. 9 and 15 may perform better when slight imbalances of light transmission occur between positive and negative polarities, especially when the eye is tracking the motion of displayed images moving across the screen. Each of the Figures shows the polarities during half of the display addressing fields. The polarities are reversed for the other half, alternating every field, resulting in a net zero current (zero DC bias), as is well known in the art.

Figure 20:
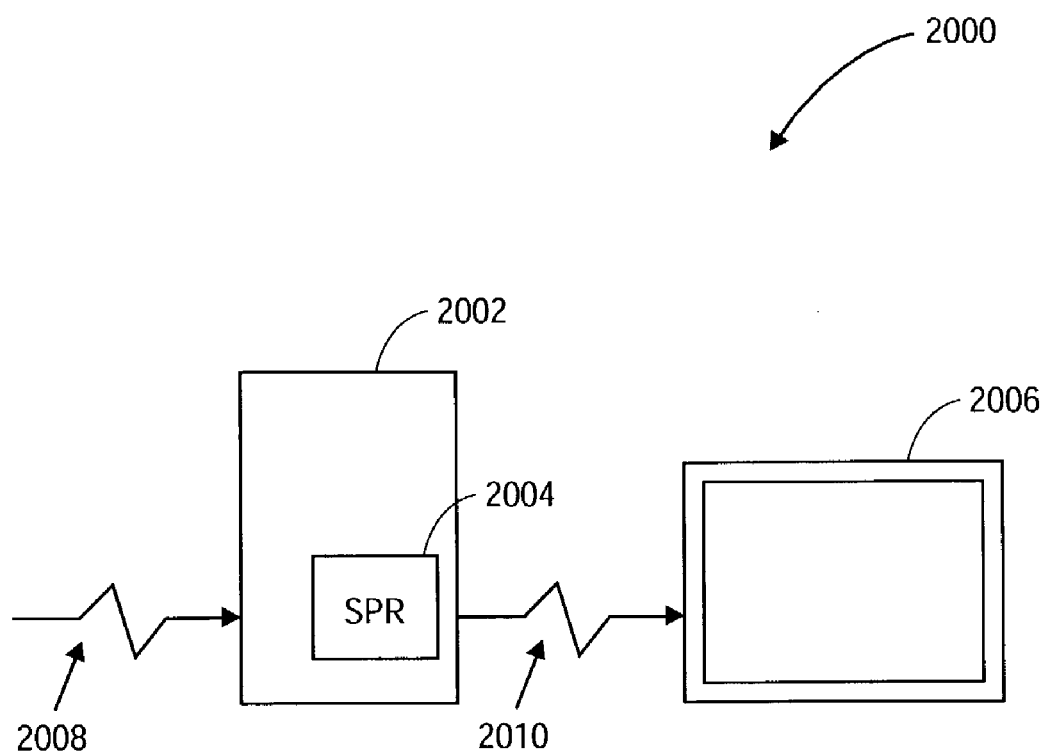
FIG. 20 depicts a system incorporating sub-pixel rendering techniques suitable to drive a panel made in accordance with the various embodiments described herein.

FIG. 20 depicts a system 2000 in which a display as constructed in accordance with the various embodiments disclosed herein is driven by a sub-pixel rendering technique 2004 which may be resident on a physical device 2002. An input image data stream 2008 may be input into the sub-pixel rendering technique 2004 and converted in the manner herein disclosed. An output image data stream 2010 is sent to the display device 2006 in order to drive the various sub-pixels to form an image thereupon. As discussed in several references incorporated herein, the sub-pixel rendering (SPR) technique 2004 may be implemented in either hardware and/or software or a combination thereof. For example, SPR techniques 2004 could be resident as logic (either hardware or software) on the display itself or it could reside on a graphics controller chip or board.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. For example, some of the embodiments above may be implemented in other display technologies such as Organic Light Emitting Diode (OLED), ElectroLumenscent (EL), Electrophoretic, Active Matrix Liquid Crystal Display (AMLCD), Passive Matrix Liquid Crystal display (AM-LCD), Incandescent, solid state Light Emitting Diode (LED), Plasma Display Panel (PDP), and Iridescent. Therefore, it is intended that the invention not be limited to the particular embodiment disclosed as the best mode contemplated for carrying out this invention, but that the invention will include all embodiments falling within the scope of the appended claims.

What is claimed is:

1. An electronic display device comprising a plurality of a sub-pixel group; said sub-pixel group further comprising eight sub-pixels disposed in two rows;
   wherein each said sub-pixel is one of a red color sub-pixel, a green color sub-pixel and a blue color sub-pixel;
   wherein said sub-pixel group further comprises four sub-pixels of said blue color, two sub-pixels of said red color and two sub-pixels of said green color;
   wherein further said sub-pixels of said red color and said sub-pixels of said green color form substantially a checkerboard pattern in said two rows such that a red sub-pixel is followed by a green sub-pixel in one of said first and second rows of said sub-pixel group, and a green sub-pixel is followed by a red sub-pixel in the other of said first and second rows of said sub-pixel group.

2. The electronic display device as recited in claim 1 wherein said sub-pixels of said blue color comprises a smaller area than said sub-pixels of said red color and said green color.

3. The electronic display device as recited in claim 1 wherein said eight sub-pixels of said sub-pixel group disposed in two rows further comprise four columns of sub-pixels; and
   wherein further a first set of two non-adjacent columns comprise four sub-pixels of said blue color and a second set of two non-adjacent columns comprise two sub-pixels of said red color and two sub-pixels of said green color.

4. The electronic display device as recited in claim 3 wherein said two non-adjacent columns comprising four sub-pixels of said blue color are offset vertically from said two non-adjacent columns comprising two sub-pixels of said red color and two sub-pixels of said green color.

5. The electronic display device as recited in claim 1 wherein said sub-pixels of said blue color are interspersed among said substantially formed checkerboard pattern of sub-pixels of said red color and said green color.

6. The electronic display device as recited in claim 1 wherein said display device is an active matrix liquid crystal display.

7. The electronic display device as recited in claim 6 wherein driver circuitry of said display device applies a polarity scheme when driving the sub-pixels in each sub-pixel group.

8. The electronic display device as recited in claim 7 wherein said polarity scheme is a 1×1 dot inversion polarity scheme.

9. The electronic display device as recited in claim 7 wherein said polarity scheme is a 2×1 dot inversion polarity scheme.

10. A method of converting incoming three-color pixel data of a first format for rendering onto an electronic display device, said electronic display device comprising a plurality of a sub-pixel group; said sub-pixel group further comprising eight sub-pixels; wherein each said sub-pixel is one of a blue color sub-pixel, a red color sub-pixel and a green color sub-pixel; wherein said sub-pixel group further comprises four sub-pixels of said blue color, two sub-pixels of said red color and two sub-pixels of said green color; wherein further said sub-pixels of said red color and said sub-pixels of said green color form substantially a checkerboard pattern in said two rows such that a red sub-pixel is followed by a green sub-pixel in one of said first and second rows of said sub-pixel group, and a green sub-pixel is followed by a red sub-pixel in the other of said first and second rows of said sub-pixel group; the steps of said method comprising:
   determining implied sample areas for each data point of said incoming three-color pixel data;
   determining a resample area for each color sub-pixel in the display device;
   forming a set of coefficients for each resample area, said coefficients comprising fractions whose denominators are a function of the resample area and whose numerators are a function of an area of each implied sample area that may partially overlap said resample area;

multiplying values of said incoming three-color pixel data for each implied sample area by a coefficient resulting in a product; and adding each product to obtain a luminance value for each resample area.

11. The method as recited in claim 10 wherein resample areas for same color sub-pixels form a resample area array; and wherein the method further comprises:

determining a phase relationship among the resample area arrays.

12. The method as recited in claim 11 wherein each resample area array includes resample points, and wherein determining the phase relationship further comprises:

overlaying said resample area arrays by positioning said resample points such that the resample points for said red color and said green color substantially overlay the resample points for said blue color.

13. A system comprising:

a display, said display comprising a plurality of a sub-pixel group; said sub-pixel group further comprising eight sub-pixels; wherein each said sub-pixel is one of a blue color sub-pixel, a red color sub-pixel and a green color sub-pixel; wherein said sub-pixel group further comprises four sub-pixels of said blue color, two sub-pixels of said red color and two sub-pixels of said green color; wherein further said sub-pixels of said red color and said sub-pixels of said green color form substantially a checkerboard pattern in said two rows such that a red sub-pixel is followed by a green sub-pixel in one of said first and second rows of said sub-pixel group, and a green sub-pixel is followed by a red sub-pixel in the other of said first and second rows of said sub-pixel group; and means for subpixel rendering input image data.

14. The system as recited in claim 13 wherein said means for subpixel rendering input data further comprises:

means for inputting a set of color image data;

means for testing the input data for a plurality of conditions wherein one of said conditions comprises testing for the presence of high spatial frequency features in the input data; and means for taking appropriate actions in response to the outcome of said testing of the input data.

15. The system as recited in claim 14 wherein said set of color image input data comprises a sample of a 1×3 matrix of input data.

16. The system as recited in claim 14 wherein said set of color image input data comprises a sample of a 1×2 matrix of input data.

17. The system as recited in claim 14 wherein said high spatial frequency feature comprises one of a group, said group comprising an edge, a line, and a dot.

18. The system as recited in claim 14 wherein means for taking appropriate actions in response to the outcome of said testing of the input data further comprises:

means for substituting a new color data value for a current color data value.

19. The system as recited in claim 14 wherein means for taking appropriate actions in response to the outcome of said testing of the input data further comprises:

means for applying gamma correction to a current color data value.

20. The system as recited in claim 14 wherein means for taking appropriate actions in response to the outcome of said testing of the input data further comprises:

means for applying new sub-pixel rendering filter coefficients to the input data.

21. The system as recited in claim 13 wherein said means for subpixel rendering input data further comprises:

means for determining implied sample areas for each data point of incoming three-color pixel data;

means for determining a resample area for each color sub-pixel in the display;

means for forming a set of coefficients for each resample area, said coefficients comprising fractions whose denominators are a function of the resample area and whose numerators are a function of an area of each implied sample area that may partially overlap said resample area;

means for multiplying the incoming pixel data for each implied sample area by the coefficient resulting in a product; and means for adding each product to obtain a luminance value for each resample area.

* * * * *